US011181455B2

(12) United States Patent
Bates et al.

(10) Patent No.: US 11,181,455 B2
(45) Date of Patent: Nov. 23, 2021

(54) CALIBRATION VERIFICATION FOR OPTICAL PARTICLE ANALYZERS

(71) Applicant: Particle Measuring Systems, Inc., Boulder, CO (US)

(72) Inventors: Thomas A. Bates, Boulder, CO (US); Matt Michaelis, Boulder, CO (US); Brett Haley, Boulder, CO (US)

(73) Assignee: Particle Measuring Systems, Inc., Boulder, CO (US)

(*) Notice: Subject to any disclaimer, the term of this patent is extended or adjusted under 35 U.S.C. 154(b) by 53 days.

(21) Appl. No.: 16/678,968

(22) Filed: Nov. 8, 2019

(65) Prior Publication Data
US 2020/0150017 A1 May 14, 2020

Related U.S. Application Data

(60) Provisional application No. 62/759,953, filed on Nov. 12, 2018.

(51) Int. Cl.
*G01N 15/02* (2006.01)
*G01N 15/06* (2006.01)
*H01S 3/00* (2006.01)

(52) U.S. Cl.
CPC ..... *G01N 15/0205* (2013.01); *G01N 15/0612* (2013.01); *H01S 3/0007* (2013.01)

(58) Field of Classification Search
CPC ........... G01N 15/0205; G01N 15/0612; G01N 15/1012; G01N 15/10; G01N 15/14; G01N 15/1434; G01N 21/17; G01N 21/47; G01N 21/53; H01S 3/0007

USPC .......................................... 356/335–343, 73
See application file for complete search history.

(56) References Cited

U.S. PATENT DOCUMENTS

| 3,851,169 A | 11/1974 | Faxvog |
| 4,348,111 A | 9/1982 | Goulas et al. |
| 4,360,270 A | 11/1982 | Jeck |
| 4,594,715 A | 6/1986 | Knollenberg |
| 4,728,190 A | 3/1988 | Knollenberg |
| 4,798,465 A | 1/1989 | Knollenberg |
| 4,893,928 A | 1/1990 | Knollenberg |

(Continued)

OTHER PUBLICATIONS

Search Report and Written Opinion, dated Jan. 22, 2020, corresponding to International Application No. PCT/US2019/060607 (filed Nov. 8, 2019), 15 pp.

(Continued)

*Primary Examiner* — Hoa Q Pham
(74) *Attorney, Agent, or Firm* — Leydig, Voit & Mayer, Ltd.

(57) ABSTRACT

Provided are particle analyzers and related methods for verifying calibration status of the particle analyzer. The method includes the steps of providing an optical particle analyzer and modulating a power applied to a source of EMR. The method includes the steps of, in response to the modulating step, inducing a detector signal waveform and analyzing the detector signal waveform to determine a value of at least one diagnostic parameter associated with one or more of the source of EMR, an optical assembly, a chamber, a detector, and an optical collection system of the optical particle analyzer. The method includes the step of determining a calibration status of the optical particle analyzer based on the one or more determined values of the at least one diagnostic parameter.

30 Claims, 24 Drawing Sheets

(56) References Cited

U.S. PATENT DOCUMENTS

| | | | |
|---|---|---|---|
| 4,957,363 A | 9/1990 | Takeda et al. |
| 5,085,500 A | 2/1992 | Blesener |
| 5,121,988 A | 6/1992 | Blesener et al. |
| 5,282,151 A | 1/1994 | Knollenberg |
| 5,283,199 A | 2/1994 | Bacon, Jr. et al. |
| 5,467,188 A | 11/1995 | Miyashita |
| 5,642,193 A | 6/1997 | Girvin et al. |
| 5,671,046 A | 9/1997 | Knowlton |
| 5,684,585 A | 11/1997 | Girvin |
| 5,726,753 A | 3/1998 | Sandberg |
| 5,751,422 A | 5/1998 | Mitchell |
| 5,805,281 A | 9/1998 | Knowlton et al. |
| 5,861,950 A | 1/1999 | Knowlton |
| 5,864,399 A | 1/1999 | Girvin et al. |
| 5,889,589 A | 3/1999 | Sandberg |
| 5,903,338 A | 5/1999 | Mavliev et al. |
| 5,920,388 A | 7/1999 | Sandberg et al. |
| 5,946,092 A | 8/1999 | Defreez et al. |
| 6,167,107 A | 12/2000 | Bates |
| 6,246,474 B1 | 6/2001 | Cerni et al. |
| 6,275,290 B1 | 8/2001 | Cerni et al. |
| 6,615,679 B1 | 9/2003 | Knollenberg et al. |
| 6,709,311 B2 | 3/2004 | Cerni |
| 6,859,277 B2 | 2/2005 | Wagner et al. |
| 6,903,818 B2 | 6/2005 | Cerni et al. |
| 6,945,090 B2 | 9/2005 | Rodier |
| 7,030,980 B1 | 4/2006 | Sehler et al. |
| 7,053,783 B2 | 5/2006 | Hamburger et al. |
| 7,088,446 B2 | 8/2006 | Cerni |
| 7,088,447 B1 | 8/2006 | Bates et al. |
| 7,208,123 B2 | 4/2007 | Knollenberg et al. |
| 7,235,214 B2 | 6/2007 | Rodier et al. |
| RE39,783 E | 8/2007 | Cerni et al. |
| 7,456,960 B2 | 11/2008 | Cerni et al. |
| 7,576,857 B2 | 8/2009 | Wagner |
| 7,667,839 B2 | 2/2010 | Bates |
| 7,746,469 B2 | 6/2010 | Shamir et al. |
| 7,796,255 B2 | 9/2010 | Miller |
| 7,916,293 B2 | 3/2011 | Mitchell et al. |
| 7,973,929 B2 | 7/2011 | Bates |
| 7,985,949 B2 | 7/2011 | Rodier |
| 8,027,035 B2 | 9/2011 | Mitchell et al. |
| 8,109,129 B2 | 2/2012 | Gorbunov |
| 8,154,724 B2 | 4/2012 | Mitchell et al. |
| 8,174,697 B2 | 5/2012 | Mitchell et al. |
| 8,427,642 B2 | 4/2013 | Mitchell et al. |
| 8,800,383 B2 | 8/2014 | Bates |
| 8,869,593 B2 | 10/2014 | Gorbunov et al. |
| 9,631,222 B2 | 4/2017 | Ketcham et al. |
| 9,638,665 B2 | 5/2017 | Gorbunov |
| 9,682,345 B2 | 6/2017 | Gromala et al. |
| 9,808,760 B2 | 11/2017 | Gromala et al. |
| 9,810,558 B2 | 11/2017 | Bates et al. |
| 9,885,640 B2 | 2/2018 | Ketcham et al. |
| 9,989,462 B2 | 6/2018 | Lumpkin et al. |
| 10,197,487 B2 | 2/2019 | Knollenberg et al. |
| 10,345,200 B2 | 7/2019 | Scialo et al. |
| 10,371,620 B2 | 8/2019 | Knollenberg et al. |
| 2005/0028593 A1 | 2/2005 | Rodier |
| 2009/0078862 A1 | 3/2009 | Rodier et al. |
| 2009/0128810 A1 | 5/2009 | Bates |
| 2009/0190128 A1 | 7/2009 | Cerni et al. |
| 2009/0268202 A1 | 10/2009 | Wagner |
| 2015/0000595 A1 | 1/2015 | Gorbunov et al. |
| 2015/0259723 A1 | 9/2015 | Hartigan et al. |
| 2016/0126081 A1 | 5/2016 | Gorbunov |
| 2016/0139013 A1 | 5/2016 | Gorbunov |
| 2017/0176312 A1 | 6/2017 | Shamir |
| 2018/0133744 A1 | 5/2018 | Gorbunov et al. |
| 2019/0145874 A1* | 5/2019 | Woolsey ............ G01N 1/2247 73/863.12 |
| 2019/0250785 A1 | 8/2019 | Pandolfi et al. |
| 2019/0323943 A1 | 10/2019 | Knollenberg et al. |
| 2019/0346345 A1 | 11/2019 | Scialo et al. |
| 2020/0072724 A1 | 3/2020 | Knollenberg et al. |
| 2020/0072729 A1 | 3/2020 | Lumpkin et al. |
| 2020/0150018 A1 | 5/2020 | Shamir |
| 2020/0158603 A1 | 5/2020 | Scialo et al. |
| 2020/0158616 A1 | 5/2020 | Knollenberg et al. |
| 2020/0240896 A1 | 7/2020 | Karasikov et al. |

OTHER PUBLICATIONS

Search Report and Written Opinion, dated Jul. 24, 2020, corresponding to International Application No. PCT/US2020/030122 (filed Apr. 27, 2020), 11 pp.

* cited by examiner

CALIBRATION VERIFICATION FOR OPTICAL PARTICLE ANALYZERS

CROSS-REFERENCE TO RELATED APPLICATIONS

This application claims the benefit of priority to U.S. Provisional Patent Application No. 62/759,953, filed Nov. 12, 2018 which is hereby incorporated by reference in its entirety.

BACKGROUND OF INVENTION

This invention is in the field of optical particle analyzers. This invention relates generally to calibration verification systems and methods for verifying the calibration status and performance of optical particle analyzers.

A large portion of the micro-contamination industry is reliant on the use of optical particle analyzers, such as are described in various U.S. patents, including U.S. Pat. Nos. 3,851,169, 4,348,111, 4,957,363, 5,085,500, 5,121,988, 5,467,188, 5,642,193, 5,864,399, 5,920,388, 5,946,092, and 7,053,783. 4,728,190, 6,859,277, and 7,030,980, also disclose optical particle analyzers and are hereby incorporated by reference in their entirety. Aerosol optical particle analyzers are used to measure air-borne particle contamination in clean-rooms and clean zones. Liquid particle analyzers are often used to optically measure particulate contamination in the water treatment and chemical processing industries.

Optical particle analyzers for these applications generally undergo calibration procedures at least once per year. International standards such as JIS B 9921: Light Scattering Automatic Particle Counter, ASTM F328-98: Standard Practice for Calibrating an Airborne Particle Counter Using Monodiperse Spherical Particles, and ISO/FDIS 21501-4: Determination of particle size distribution—Single particle light interaction methods—Part 4: Light scattering airborne particle counter for clean spaces are available that detail the calibration requirements for optical particle analyzers.

The calibration process for an optical particle analyzer is complicated and usually requires trained representatives from the optical particle analyzer manufacturer to perform the calibration. The calibration process is centered on the use of certified particle size standards. By way of example only, in the United States, these standards are water suspended polystyrene spheres, traceable to the National Institute of Standards and Technology (NIST).

A typical particle generation system for providing calibration standard particles to an aerosol optical particle analyzer pulls filtered air into the system using a pump. As the calibration standard particles are water suspended, they must be aerosolized for detection by an aerosol optical particle analyzer. The water and particle mixture is placed into a nebulizer where it is aerosolized by the nebulizer with a stream of pressurized air produced by the particle generator pump. In this manner, mono-dispersed particles of known sizes are used to calibrate each corresponding particle channel of the particle analyzer. For example, a 1.0 µm particle is used to calibrate a 1.0 µm channel. This ensures that each particle channel of the unit under test sizes particles accurately.

In addition to the testing described above, it is also generally required to inter-compare the test instrument with a reference particle analyzer that includes an entirely different flow system in addition to that utilized by the instrument under test. This is done, for example, to ensure the test instrument achieves 50% counting efficiency at its stated first channel particle size, and 100% counting efficiency at 1.5 to 2.0 times its stated first channel particle size.

It is generally also required to measure and confirm the flow rate of the unit under test with a NIST traceable flow meter, as well as to perform a zero-count (false count rate) test. For some applications, the instrument is generally required to demonstrate an achievable false count rate of less than one count in five minutes with a 95% upper confidence limit. This test is very time consuming and may require an extended total sampling time of over an hour.

A full optical particle analyzer calibration is complicated and, thus, generally must be performed by a trained representative from the particle analyzer manufacturer. A full calibration typically requires a large amount of test equipment which is not portable. Generally, the optical particle analyzer under test must be brought to the calibration equipment location.

For cost reasons and ease of implementation, particle analyzer users generally limit calibration to a one year calibration cycle, as typically recommended by particle analyzer manufacturers. Particle analyzer users must assume that the particle analyzer will maintain proper calibration throughout the one year calibration cycle, although this is sometimes not the case.

Aerosol particle analyzer users are segmented into a number of industries. For example, the semiconductor and pharmaceutical industries are two industries for which particle measuring plays a significant role. Semiconductor users generally monitor aerosol contamination in order to improve or maintain wafer yield levels. If an aerosol optical particle analyzer drifts out of calibration in one of these clean areas, the particle analyzer may over- or under-count the particle level in the clean area. If the particle analyzer is under-counting, the clean area may be dirtier than the user believes. In a worst case scenario, the user may experience a drop off in wafer yield due to this undetected particle contamination. While the drop off in yield is undesirable, the user is at least given real time feed-back from quality control monitoring of the wafer yield, and will have some stimulation to investigate a possible problem within that specific clean area. Ultimately, the out of calibration particle analyzer would be revealed as the reason for the drop off in wafer yield.

An out of calibration particle analyzer also presents significant problems to a pharmaceutical user. Pharmaceutical users must monitor clean areas where pharmaceuticals are handled or processed. In the United States, this monitoring is mandated by the Food and Drug Administration (FDA). The process areas must be maintained to a specified cleanliness level established for certain pharmaceutical products. If a particle analyzer is under-counting, the clean process area may be dirtier than the user believes. The user has no means of detecting the out of calibration particle analyzer, as there is no real time feed-back of any process that would indicate a problem. The user may continue to process pharmaceuticals in the suspect clean area for the remainder of the annual calibration cycle of the particle analyzer, before finally being informed that the particle analyzer was out of calibration upon its next scheduled calibration.

As liquid particle analyzers are often used to optically measure particulate contamination in purified water and chemical streams, when a liquid particle analyzer is under-counting, the water or chemical streams may include particulate levels higher than a user believes. For example, if a liquid source includes particle levels higher than expected, this may result in an end product, of which this liquid which is a component, having contamination levels higher than expected. As above, this may pose a significant problem, for example if the end product is a pharmaceutical composition. Alternatively, if the liquid is utilized, for example, as a rinse, wash or solvent during the processing of a semiconductor device, particle contamination of the semiconductor device may result, resulting in decreased semiconductor device yield.

Once the particle analyzer is defined as out of calibration, the status of the clean area that it monitored for that entire calibration cycle (typically a year) is in question. If it is determined that the particle analyzer sufficiently undercounted so as to place the actual clean area it monitored above the allowed FDA specified contamination limit, all product produced in that area for the entire year becomes suspect. The user may be forced to recall the entire year's pharmaceutical product produced in the suspect area. This is a fundamental set-back for many reasons, including monetary, such as costing the pharmaceutical user millions of dollars in lost product.

Optical particle analyzers may become mis-calibrated for a number of reasons including drift in the detection electronics; such a mis-calibrated particle analyzer may still properly count the total number of particles but may mis-identify the real sizes of particles. At least some known systems and methods for evaluating the calibration status of optical particle analyzers employ actual particles for testing the optical particle analyzer. Although not typically as expensive and time-consuming as performing a full calibration procedure, evaluating the calibration status of optical particle analyzers using actual particles is not a trivial procedure. Thus, it would be beneficial to employ systems and methods for efficiently evaluating the calibration status of optical particle analyzers that do not require use of actual particles.

SUMMARY OF THE INVENTION

Disclosed herein are methods and systems enabling self-diagnostic features to verify calibration status for optical particle analyzers, including determining components' functional health, such as for the responsivity of the photo-detector and subsequent amplification circuitry, amount of laser pulse light collected by the collecting optics, scattered particle light collecting optics output, and laser power level. Verifying optical particle analyzer calibration status and determining components' functional health may be accomplished by cycling (e.g., modulating) laser power and then detecting particle gain stage pulse activity on high gain detector circuit (e.g., referred to herein as amplification circuitry). By modulating applied laser power (e.g., a single cycle of which may be referred to as a "check pulse" herein), and the detecting particle gain stage AC coupling pulse activity on the high gain detector circuit (e.g., the amplification circuitry), the disclosed systems and methods are sensitive and accurate. The disclosed systems and methods may be implemented as a calibration verification self-diagnostic system for optical particle analyzer instruments, and they may be used to increase the probability of an instrument successfully completing as-found calibration verification at the end of its calibration use cycle (e.g., annual).

The pulsed change in laser power level, alters the established DC voltage level at the output of the photo-detector current-to-voltage converter. As this sudden DC voltage shift is fed into the subsequent AC coupled amplification of the photo-detector signal, a pulse is generated by the AC coupling circuitry. The leading edge of the resultant detector signal waveform represents the speed at which the laser power level was increased, while the trailing edge of the detector signal waveform peak represents the speed at which the AC coupling circuity discharges. The amplitude of the pulse peak on the detector signal waveform is directly correlated to several functional health indicators of the particle detection system of the particle counter, including: the amount of laser power that was pulsed, the amount of laser pulse light collected by the collecting optics, and the responsivity of the photo-detector and subsequent amplification circuitry. The calibration verification test using the systems and methods described herein may be performed by adding an additional high speed ADC, or a less costly low speed ADC to existing optical particle analyzer instruments systems (e.g., the digital processing system of the LASAIR®-Pro instrument (Particle Measuring Systems, Inc.).

The disclosed systems and methods are sensitive and accurate in cases where no particles are present in the sample medium, as is the case while sampling filtered air. The disclosed systems and methods may also be practiced using unfiltered ambient air, with no flow through the instrument sample chamber. In this latter case, particles in the beam may cause outlier data points, which may either be averaged out for multiple runs of the calibration verification test pulses or, for those exceeding a predetermined threshold signal, be omitted from the quantitative analysis. The amplification circuit may also be frequency tuned to largely not respond to the particle (when sampling at normal instrument flow rate) and pulse noise events.

In an embodiment, a method for verifying calibration of an optical particle analyzer is provided. The method includes the step of providing an optical particle analyzer. The optical particle analyzer includes a source of electromagnetic radiation ("EMR") for generating a beam of the EMR. The optical particle analyzer includes a chamber for containing a sample medium and for receiving the beam of EMR. The optical particle analyzer includes an optical assembly in optical communication with the source of EMR for directing the beam of EMR from the source to the chamber. The optical particle analyzer includes a detector for detecting scattered radiation from the beam of EMR. The optical particle analyzer includes an optical collection system for directing scattered radiation from the beam of EMR from the chamber and to the detector. The method includes the step of modulating a power applied to the source of EMR. The method includes the step of, in response to the modulating step, inducing a detector signal waveform. The method includes the step of analyzing the detector signal waveform to determine a value of at least one diagnostic parameter associated with one or more of the source of EMR, the optical assembly, the chamber, the detector, and the optical collection system. The method includes the step of determining a calibration status of the optical particle analyzer based on the one or more determined values of the at least one diagnostic parameter.

In an embodiment, a method for verifying calibration of an optical particle analyzer is provided. The method includes the step of providing an optical particle analyzer. The optical particle analyzer includes a laser for generating a laser beam. The optical particle analyzer includes a flow chamber for containing a sample medium and for receiving the laser beam. The optical particle analyzer includes an optical assembly in optical communication with the laser for directing the laser beam from the laser to the flow chamber. The optical particle analyzer includes a detector for detecting scattered radiation from the laser beam. The optical particle analyzer includes an optical collection system for directing scattered radiation from the laser beam from the flow chamber and to the detector. The method includes the step of modulating a power applied to the laser from a first power level to a second power level. The method includes the step of, in response to the modulating step, inducing a detector signal waveform. The method includes the step of analyzing the detector signal waveform to determine a value of at least one diagnostic parameter associated with one or more of the laser, the optical assembly, the flow chamber, the detector, and the optical collection system. The at least one diagnostic parameter includes an amplitude of a peak of the detector signal waveform corresponding to a difference in detector signal amplitudes between: the scattered radiation detected by the detector from the laser beam at a first radiant power level from the laser having the applied power at the first power level; and the scattered radiation detected by the detector from the laser beam at a second radiant power level from the laser having the applied power at the second power level. The method includes the step of determining a calibration status of the optical particle analyzer based on the one or more determined values of the at least one diagnostic parameter.

In an embodiment, an optical particle analyzer is provided. The optical particle analyzer includes a source of EMR for generating a beam of the EMR. The optical particle analyzer includes a chamber for containing a sample medium and for receiving the beam of EMR. The optical particle analyzer includes an optical assembly in optical communication with the source of EMR for directing the beam of EMR from the source of EMR to the chamber. The optical particle analyzer includes a detector for detecting scattered radiation from the beam of EMR. The optical particle analyzer includes an optical collection system for directing scattered radiation from the beam of EMR from the chamber and to the detector. The optical particle analyzer includes a processor operably connected to the source of EMR and the detector. The processor is programmed to modulate a power applied to the source of EMR from a first power level to a second power level. The processor is programmed to analyze a scattered radiation detector signal waveform induced by the modulation of the power applied to the source of EMR. The processor is programmed to determine a value of at least one diagnostic parameter associated with one or more of the source of EMR, the chamber, the optical assembly, the detector, and the optical collection system. The processor is programmed to determine a calibration status of the optical particle analyzer based on the one or more determined values of the at least one diagnostic parameter.

In an embodiment, an optical particle analyzer is provided. The optical particle analyzer includes a laser for generating a laser beam. The optical particle analyzer includes a flow chamber for containing a sample medium and for receiving the laser beam. The optical particle analyzer includes an optical assembly in optical communication with the laser for directing the laser beam from the laser to the flow chamber. The optical particle analyzer includes a detector for detecting scattered radiation from the laser beam. The optical particle analyzer includes an optical collection system for directing scattered radiation from the laser beam from the flow chamber and to the detector. The optical particle analyzer includes a processor operably connected to the laser and the detector. The processor is programmed to modulate a power applied to the laser from a first power level to a second power level. The processor is programmed to analyze a scattered radiation detector signal waveform induced by the modulation of the power applied to the laser. The processor is programmed to determine a value of at least one diagnostic parameter associated with one or more of the laser, the flow chamber, the optical assembly, the detector, and the optical collection system. The at least one diagnostic parameter includes an amplitude of a peak of the scattered radiation detector signal waveform corresponding to a difference in detector signal amplitudes between: the scattered radiation detected by the detector from the laser beam at a first radiant power level from the laser having the applied power at the first power level; and the scattered radiation detected by the detector from the laser beam at a second radiant power level from the laser having the applied power at the second power level. The processor is programmed to determine a calibration status of the optical particle analyzer based on the one or more determined values of the at least one diagnostic parameter.

In an embodiment, a non-transient computer-readable storage medium is provided. The non-transitory computer-readable storage medium includes processor-executable instructions stored therein to verify the calibration of an optical particle analyzer having a source of EMR, a chamber, an optical assembly, a detector, and an optical collection system. When executed by one or more processors, the processor-executable instructions cause the one or more processors to modulate a power applied to the source of EMR from a first power level to a second power level. When executed by the one or more processors, the processor-executable instructions cause the one or more processors to analyze a scattered radiation detector signal waveform induced by the modulation of the power applied to the source of EMR. When executed by the one or more processors, the processor-executable instructions cause the one or more processors to determine a value of at least one diagnostic parameter associated with one or more of the source of EMR, the chamber, the optical assembly, the detector, and the optical collection system. When executed by the one or more processors, the processor-executable instructions cause the one or more processors to determine a calibration status of the optical particle analyzer based on the one or more determined values of the at least one diagnostic parameter.

In an embodiment, a non-transient computer-readable storage medium is provided. The non-transitory computer-readable storage medium includes processor-executable instructions stored therein to verify the calibration of an optical particle analyzer having a laser, a flow chamber, an optical assembly, a detector, and an optical collection system. When executed by one or more processors, the processor-executable instructions cause the one or more processors to modulate a power applied to the laser from a first power level to a second power level. When executed by the one or more processors, the processor-executable instructions cause the one or more processors to analyze a scattered radiation detector signal waveform induced by the modulation of the power applied to the laser. When executed by the one or more processors, the processor-executable instructions cause the one or more processors to determine a value of at least one diagnostic parameter associated with one or more of the laser, the flow chamber, the optical assembly, the detector, and the optical collection system. The at least one diagnostic parameter includes an amplitude of a peak of the scattered radiation detector signal waveform corresponding to a difference in detector signal amplitudes between: the scattered radiation detected by the detector from the laser beam at a first radiant power level from the laser having the applied power at the first power level; and the scattered radiation detected by the detector from the laser beam at a second radiant power level from the laser having the applied power at the second power level. When executed by the one or more processors, the processor-executable instructions cause the one or more processors to determine a calibration status of the optical particle analyzer based on the one or more determined values of the at least one diagnostic parameter.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

DETAILED DESCRIPTION OF THE INVENTION

Figure 1:
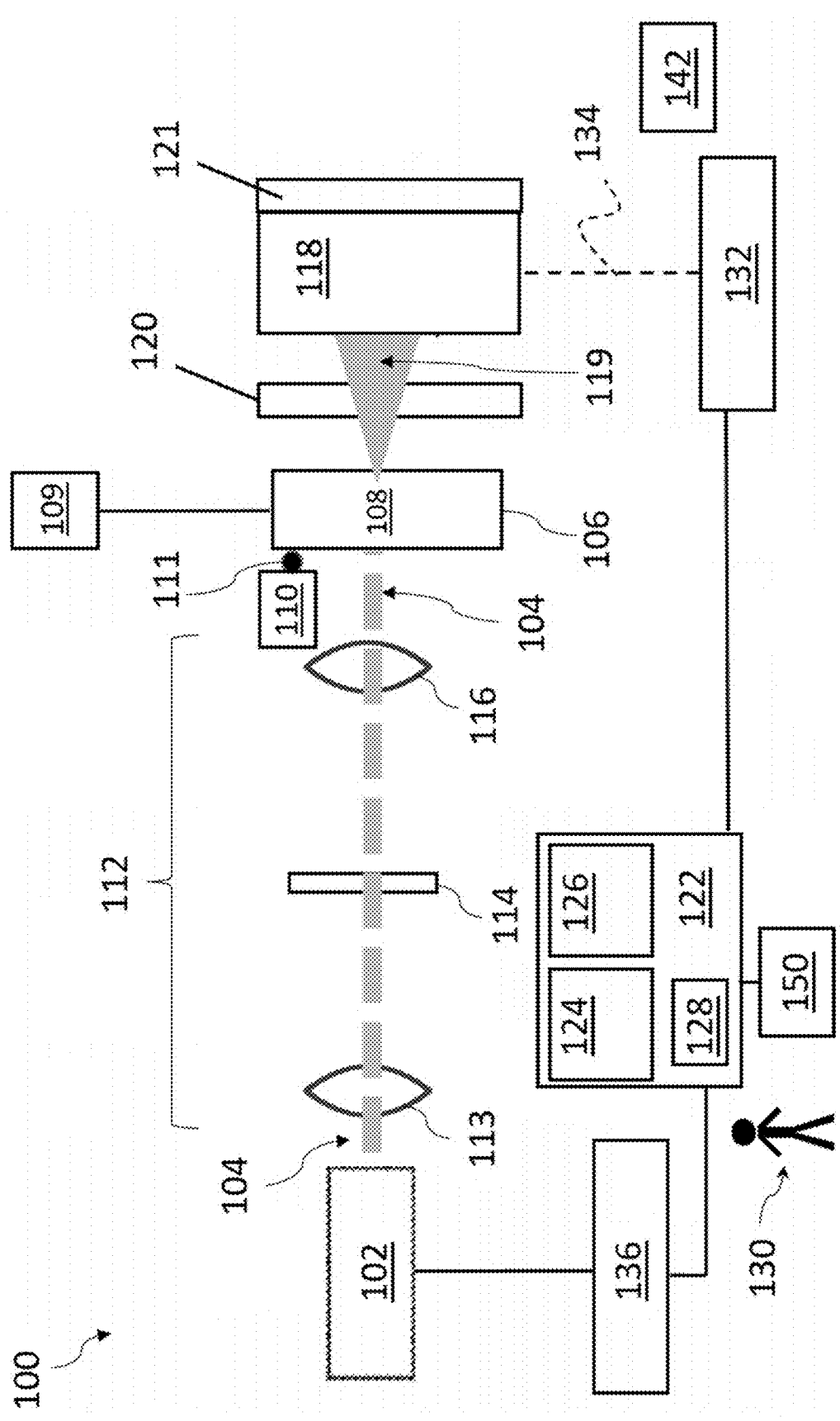
FIG. 1 is a schematic diagram of an optical particle analyzer.

In the following description, numerous specific details of the devices, device components and methods of the present invention are set forth in order to provide a thorough explanation of the precise nature of the invention. It will be apparent, however, to those of skill in the art that the invention can be practiced without these specific details.

In general, the terms and phrases used herein have their art-recognized meaning, which can be found by reference to standard texts, journal references and contexts known to those skilled in the art. The following definitions are provided to clarify their specific use in the context of the invention.

The term "sample medium" refers to the matter or collection of matter comprising a sample to be measured by an optical particle analyzer. As an example, an optical particle analyzer may sample air from an environment. The air may or may not contain particles and it is thus one object of using the optical particle analyzer to determine whether or not the air in the environment has particles. In this example, the sample medium is the air of the environment.

The term "diagnostic parameter" refers to a measurable quantity or quality determined analytically through one or more outputs of the optical particle analyzer such as a detector signal waveform. The values of diagnostic parameters are determined at times between successful calibration events of the optical particle analyzer.

The term "diagnostic parameter associated with" refers to one or more values of the determined diagnostic parameters being representative of operational conditions and functioning of particle component(s) in the optical particle analyzer. For instance, values of a particular diagnostic parameter may vary according to a radiant power of scattered light incident upon on a photodiode-based detector of the optical particle analyzer. In this case, a determined value for such a diagnostic parameter that is less than an expected value (e.g., an out of specification result) may, for example and without limitation, indicate an operational problem with the source of electromagnetic radiation (e.g., a laser) whose beam is scattered and subsequently detected by the detector of the optical particle analyzer.

The term "operational condition" refers to a state of functioning of a particular component or set of components of the optical particle analyzer. Operational condition may be a strictly binary status where the component(s) are either functional or are non-functional. Operational condition may be a status on a continuum of functionality ranging from fully functional to fully non-functional. Such a continuum of functionality may include intermediate state(s) such as nearing an out of specification status and/or requiring some maintenance operation according to a predetermined schedule. As described in detail herein, values of diagnostic parameters determined using disclosed systems and methods may be associated with the operational condition of the respective component(s) of the optical particle analyzer for which the diagnostic parameters are associated.

The term "calibration status" refers to a particular functional state of the optical particle analyzer reflecting whether the optical particle analyzer is "in-calibration" or "out-of-calibration." The calibration status of a particular optical particle analyzer is the status since the last successful calibration was performed and/or certified for that same particular particle analyzer. Calibration status may be a binary status where the particular optical particle analyzer is either in-calibration or is out-of-calibration. Calibration status may be a status on a continuum of statuses ranging from in-calibration to out-of-calibration. Such a continuum may include an intermediate status such as nearing an out-of-calibration status, nearing a time for a scheduled calibration, and/or approaching or exceeding one or more predetermined control alert limit(s). Depending on the application of interest, an analyzer may be defined as "calibrated" if it is within a user-defined tolerance, such as providing a parameter that is within 10%, within 5%, within 1% or within 0.1% of absolute calibrated.

The term "calibration parameter" takes on the same meaning as "diagnostic parameter," with the exception that values of calibration parameters are determined during the same time for which successful calibration events are performed for the optical particle analyzer (e.g., determined between the start of the calibration event and the end of the calibration event).

The term "leading edge function" refers to an equation that defines or at least approximates the leading edge of the detector signal waveform.

The term "energization state" refers to a qualitative and/or quantitative measure of the stored electrical energy in a component of the optical particle analyzer.

The term "operably connected to" refers to two or more functionally-related components being coupled to one another for purposes of flow of electric current and/or flow of data signals. This coupling of the two or more components may be a wired connection and/or a wireless connection. The two or more components that are so coupled via the wired and/or wireless connection may be proximate one another (e.g., in the same room or in the same housing as the optical particle analyzer) or they may be separated by some distance in physical space (e.g., in a different building from the location of the optical particle analyzer).

The term "optical communication" refers to components that are arranged in a manner that allows light or electromagnetic radiation to transfer between the components.

The term "radiation" refers to energy in the form of waves and/or particles, such as energy undergoing emission or transmission through space or through a material medium. Preferably for some methods and applications, the term "radiation" refers to electromagnetic radiation. The term "electromagnetic radiation" and "light" are used synonymously in the present description and refer to waves, and/or photons, of electric and magnetic fields. As used herein, electromagnetic radiation includes, but is not limited to, radio waves, microwaves, infrared, visible light, ultraviolet, X-rays, and gamma rays. Electromagnetic radiation useful for the methods of the present invention includes, but is not limited to ultraviolet light, visible light, infrared light, or any combination of these having wavelengths between approximately 100 nanometers (nm) to approximately 15 microns (μm). The term "scattered radiation" refers to radiation resulting from scattering of radiation, such as radiation resulting from scattering of at least a portion of a beam (or, energy content thereof) of electromagnetic radiation. For example, an interaction between a beam of electromagnetic radiation, such as a laser beam, and matter, such as particles present in a medium through which the beam is being transmitted, may comprise scattering of at least a portion of the beam, or energy content thereof, of the electromagnetic radiation. For example, at least a fraction of photons of a beam of electromagnetic radiation may be scattered due interaction with matter or a non-uniformity in a medium. The terms "scattering" and "scatter" refer to a process by which radiation, such as electromagnetic radiation, is forced to deviate from a straight trajectory due to interaction with one or more non-uniformities in a medium through which the radiation is being emitted or transmitted. For example, scattering may refer to waves, or their quanta, photons, of electromagnetic radiation undergoing deviation(s) from one straight trajectory to at least a second trajectory due to interaction with matter or non-uniformity, such as one or more particles, in a medium, such as a fluid (e.g., gas, air, liquid, etc.), through which the waves, or photons, of electromagnetic radiation are being emitted or transmitted.

The terms "approximately" and "about" are used interchangeably and refer to a value that is within 20%, within 10%, within 5%, or, optionally, equal to a given reference value. For example, a wavelength that is about 100 nm is any wavelength that is within 20%, within 10%, within 5%, or preferably in some applications equivalent to 100 nm.

"Particles" refers to small objects which are often regarded as contaminants. A particle can be any material created by the act of friction, for example, when two surfaces come into mechanical contact and there is mechanical movement. Particles can be composed of aggregates of material, such as dust, dirt, smoke, ash, water, soot, metal, minerals, or any combination of these or other materials or contaminants. "Particles" may also refer to biological particles, for example, viruses, spores and microorganisms including bacteria, fungi, archaea, protists, other single cell microorganisms and specifically those microorganisms having a size on the order of 1-15 μm. A particle may refer to any small object which absorbs or scatters light and is thus detectable by an optical particle counter. As used herein, "particle" is intended to be exclusive of the individual atoms or molecules of a carrier fluid, for example water molecules, process chemical molecules, oxygen molecules, helium atoms, nitrogen molecules, etc. Some embodiments of the present invention are capable of detecting, sizing, and/or counting particles comprising aggregates of material having a size greater than 10 nm, 20 nm, 30 nm, 50 nm, 100 nm, 500 nm, 1 μm or greater, or 10 μm or greater. Specific particles include particles having a size selected from 20 nm to 50 nm, 50 nm to 50 μm, a size selected from 100 nm to 10 μm, or a size selected from 500 nm to 5 μm.

FIG. 1 schematically illustrates an exemplary optical particle analyzer 100. The optical particle analyzer 100 includes a source of electromagnetic radiation ("EMR") 102 for generating a beam of EMR 104. In one embodiment, the source of EMR 102 includes at least one of a laser, a laser diode, a strip diode laser, a light emitting diode, and an incandescent lamp. In embodiments for which the source of EMR 102 includes the laser, the beam of EMR 104 includes a laser beam. In an embodiment, the laser includes at least one of a laser diode and a strip diode laser.

The optical particle analyzer 100 shown in FIG. 1 includes a chamber 106 for containing a sample medium 108 and for receiving the beam of EMR 104. In embodiments for which the source of EMR 102 includes the laser, the chamber 106 receives the laser beam. In an embodiment, the sample medium 108 includes particles. In an embodiment, the sample medium 108 includes a fluid (e.g., a liquid and/or gas). In an embodiment, the chamber 106 includes or is a cuvette. In an embodiment, the chamber 106 includes or is a flow chamber for containing the sample medium 108 and for receiving the beam of EMR 104; the flow chamber may have a sample inlet and a sample outlet, with means for reliably introducing a flow of sample into and out of the flow chamber, such as pumps, inlets, outlets, conduits, valves, flow controllers, and the like. In embodiments for which the chamber 106 includes the flow chamber and for which the sample medium 108 includes the fluid, the optical particle analyzer 100 may include a flow system 109 for flowing the fluid through the flow chamber. In such embodiments, the optical particle analyzer 100 may include a filter 110 for filtering the fluid upstream (e.g., before the fluid enters an interior of the flow chamber through an inlet 111) of the flow chamber. In the case of airborne particles, the air stream of fluid making up the sample medium 108 need not be confined within the chamber 106, but rather may flow through the chamber from the surrounding environment.

The optical particle analyzer 100 shown in FIG. 1 includes an optical assembly 112 in optical communication with the source of EMR 102 for directing the beam of EMR 104 from the source of EMR 102 to the chamber 106. In embodiments for which the source of EMR 102 includes the laser, the optical assembly 112 may be in optical communication with the laser, and the associated beam of EMR (e.g., laser beam) generated by the laser, for directing the laser beam from the laser to the chamber 106. In an embodiment, the optical assembly 112 may include one or more lenses, masks, and/or filters. In the illustrated embodiment, the optical assembly 112 includes a first lens 113, a mask 114, and a second lens 116 for focusing the beam of EMR 104 inside the chamber 106. In embodiments for which the source of EMR 102 includes the laser, the second lens 116 may focus the laser beam inside the chamber 106.

The optical particle analyzer 100 shown in FIG. 1 includes a detector 118 for detecting scattered radiation 119 from the beam of EMR 104. In embodiments for which the source of EMR 102 includes the laser, the detector 118 detects scattered radiation 119 from the laser beam. The optical particle analyzer 100 includes an optical collection system 120 for directing the scattered radiation 119 from the beam of EMR 104 from the chamber 106 and to the detector 118. In embodiments for which the source of EMR 102 includes the laser, the optical collection system 120 directs the scattered radiation 119 from the laser beam from the chamber 106 and to the detector 118. In an embodiment, the optical particle analyzer 100 may include an additional detector for normalization (e.g., a normalization detector 121) for detecting light leaving the cell or chamber 106.

The optical particle analyzer 100 shown in FIG. 1 may include a computing system 122 having one or more processors 124 and one or more memory devices 126 operably connected to the one or more processors 124. The memory devices 126 include at least one non-transient processor-readable medium capable of storing program instructions encoded as software executable by processor(s) 124. The computing system 122 may include a user interface 128 for facilitating operational interactions and information visualizations and/or manipulations (e.g., via a display 150, a keyboard and/or other I/O devices, not shown in FIG. 1) by a user 130 of the optical particle analyzer 100 with the computing device 122 and/or other components and subsystems of the optical particle analyzer 100.

The optical particle analyzer 100 shown in FIG. 1 may include amplification circuitry 132 operably coupled to the processor(s) 124 and operably coupled to the detector 118 for amplifying detector signals 134. The optical particle analyzer 100 may include drive circuitry 136 operably coupled to the processor(s) 124 and operably coupled to the source of EMR 102. In embodiments for which the source of EMR 102 includes the laser, the drive circuitry 136 is for the laser.

In an embodiment, processor(s) 124 may execute software stored in memory device(s) 126 for controlling various components of the optical particle analyzer 100 during operation. In an embodiment, the processor(s) 124 may control the source of EMR 102 via the drive circuitry 136 (e.g., by controlling user 130-specified frequencies, voltages, currents, waveforms, duty cycles, and other control parameters implemented by the drive circuitry 136). In an embodiment, the processor(s) 124 may be operably coupled to the flow system 109 (e.g., flow controller, pump, valves, conduits, etc.) and the processor(s) 124 may control the flow system 109 by, for example, controlling user 130-specified flow rates and other control parameters implemented by the flow system 109. In an embodiment, the processor(s) 124 may receive the detector signal 134 and, after decoding information encoded by the detector signals 134, store the decoded information in the memory device(s) 126. The optical particle analyzer 100 may include a power supply 142 for providing electric power to the various components and systems of the optical particle analyzer 100 requiring electric power to function.

Figure 2:
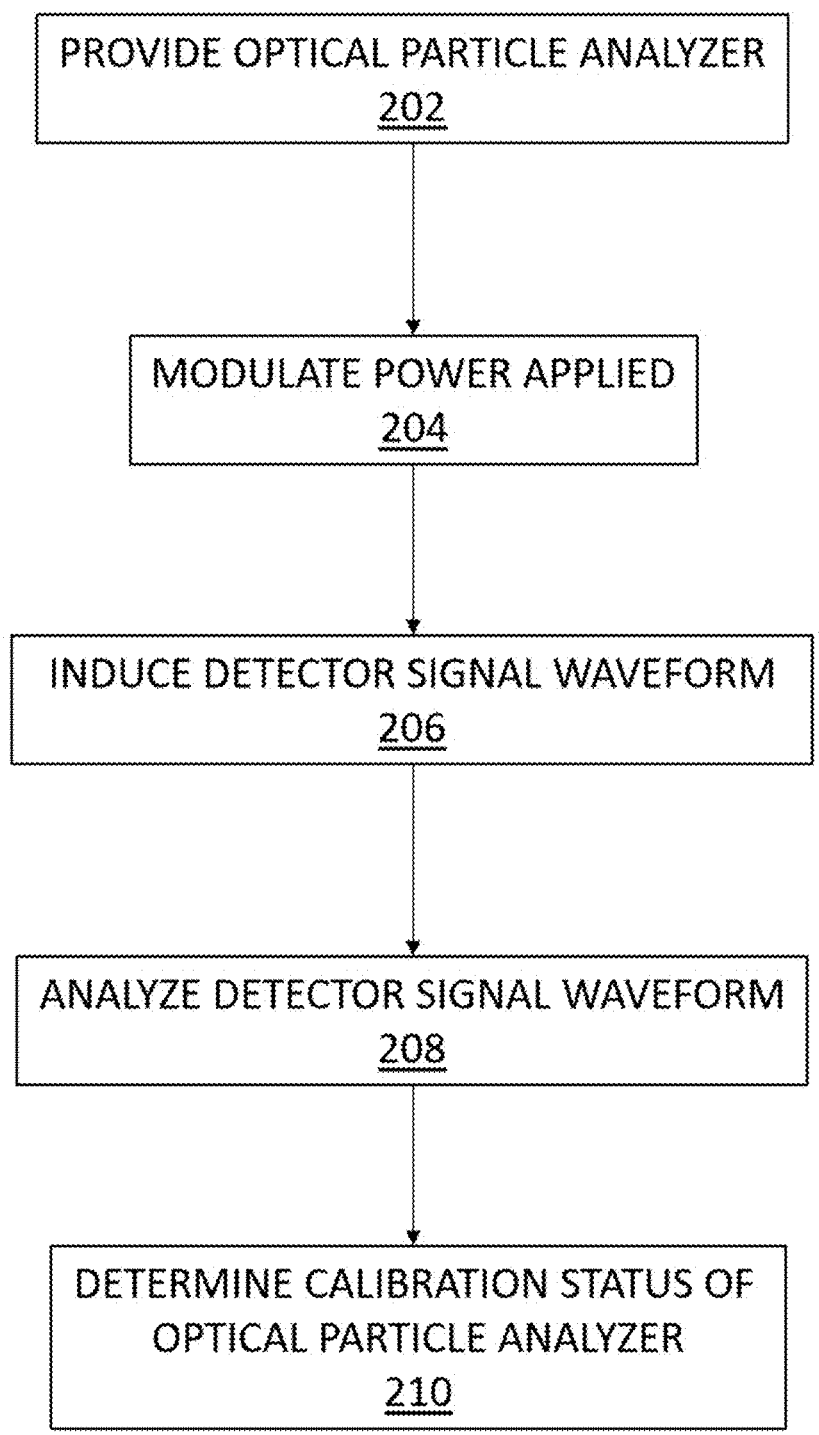
FIG. 2 is a flowchart of a method for verifying calibration of an optical particle analyzer in accordance with one embodiment of the disclosure.

FIG. 2 is a flowchart of a method 200 for verifying calibration status of an optical particle analyzer (e.g., optical particle analyzer 100) in accordance with one embodiment of the disclosure. The method 200 includes a providing step 202. The providing step 202 includes providing an optical particle analyzer, including any of the analyzers described herein. In an embodiment, the providing step 202 includes providing the optical particle analyzer 100 described above with reference to FIG. 1. In embodiments for which the source of EMR 102 includes the laser, the providing step 202 includes providing the optical particle analyzer 100 having the laser for generating the laser beam. In embodiments for which the chamber 106 includes the flow chamber, the providing step 202 includes providing the optical particle analyzer 100 having the flow chamber for containing the sample medium 108 and for receiving the beam of EMR. In embodiments for which the source of EMR 102 includes the laser and for which the chamber 106 includes the flow chamber, the providing step 202 includes providing the optical particle analyzer 100 having the flow chamber for containing the sample medium 108 and for receiving the laser beam.

The method 200 shown in FIG. 2 includes a modulating step 204. The modulating step 204 includes modulating a power applied to the source of EMR 102. The modulating step 204 may include modulating the power applied to the source of EMR 102 from a first power level to a second power level. In an embodiment, the first power level applied to the source of EMR 102 for the modulating step 204 is 0 (zero) Watts (W) and the second power level applied to the source of EMR 102 for the modulating step 204 is greater than 0 W. In an embodiment, the first power level applied to the source of EMR 102 for the modulating step 204 is less than the second power level applied to the source of EMR 102 for the modulating step 204. In embodiments for which the source of EMR 102 includes the laser, the modulating step 204 includes modulating the power applied to the laser from the first power level to the second power level.

Figure 3:
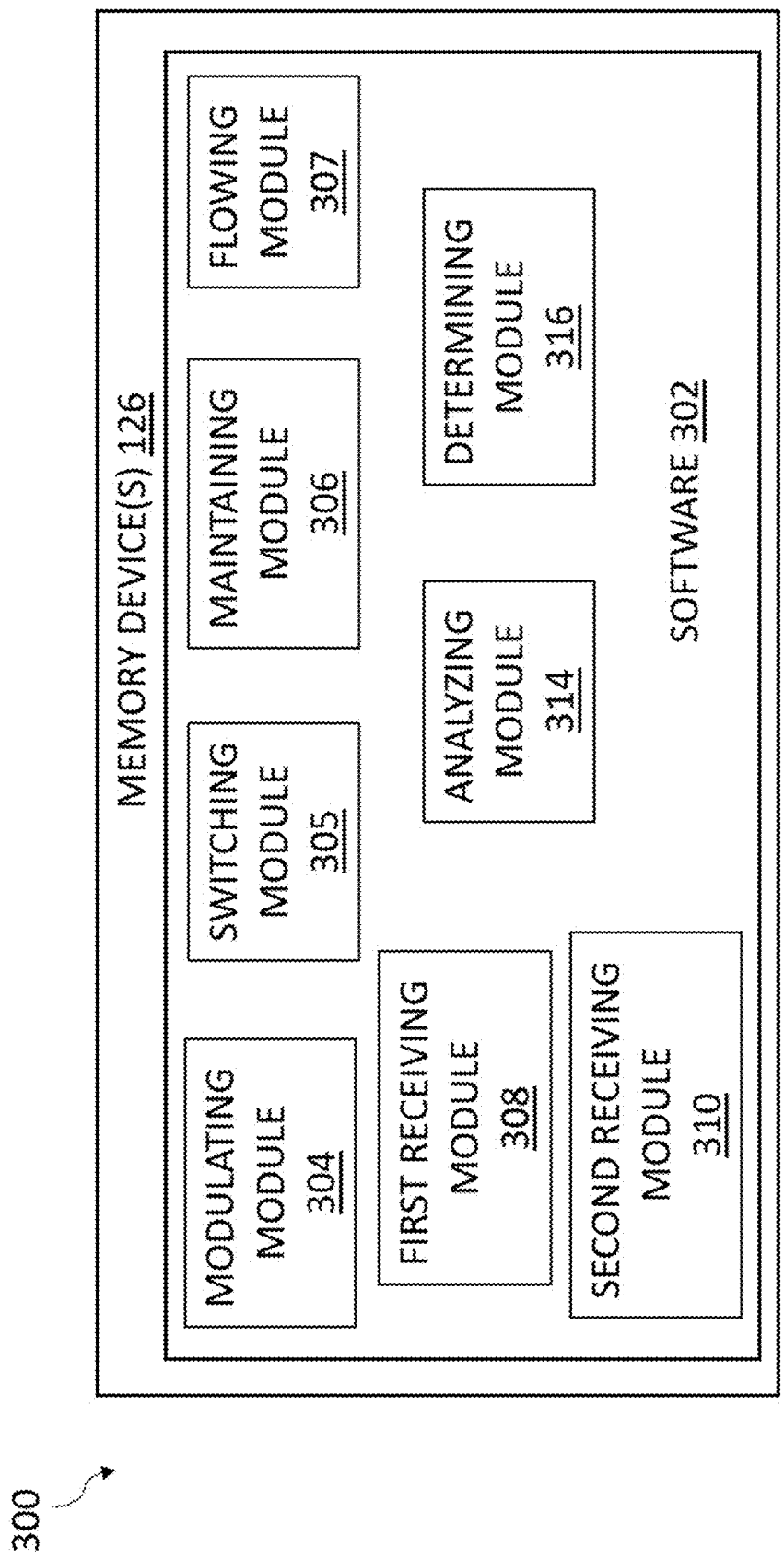
FIG. 3 is a block diagram of a software architecture that may be used for performing the method shown in FIG. 2 in accordance with one embodiment of the disclosure.
Figure 4:
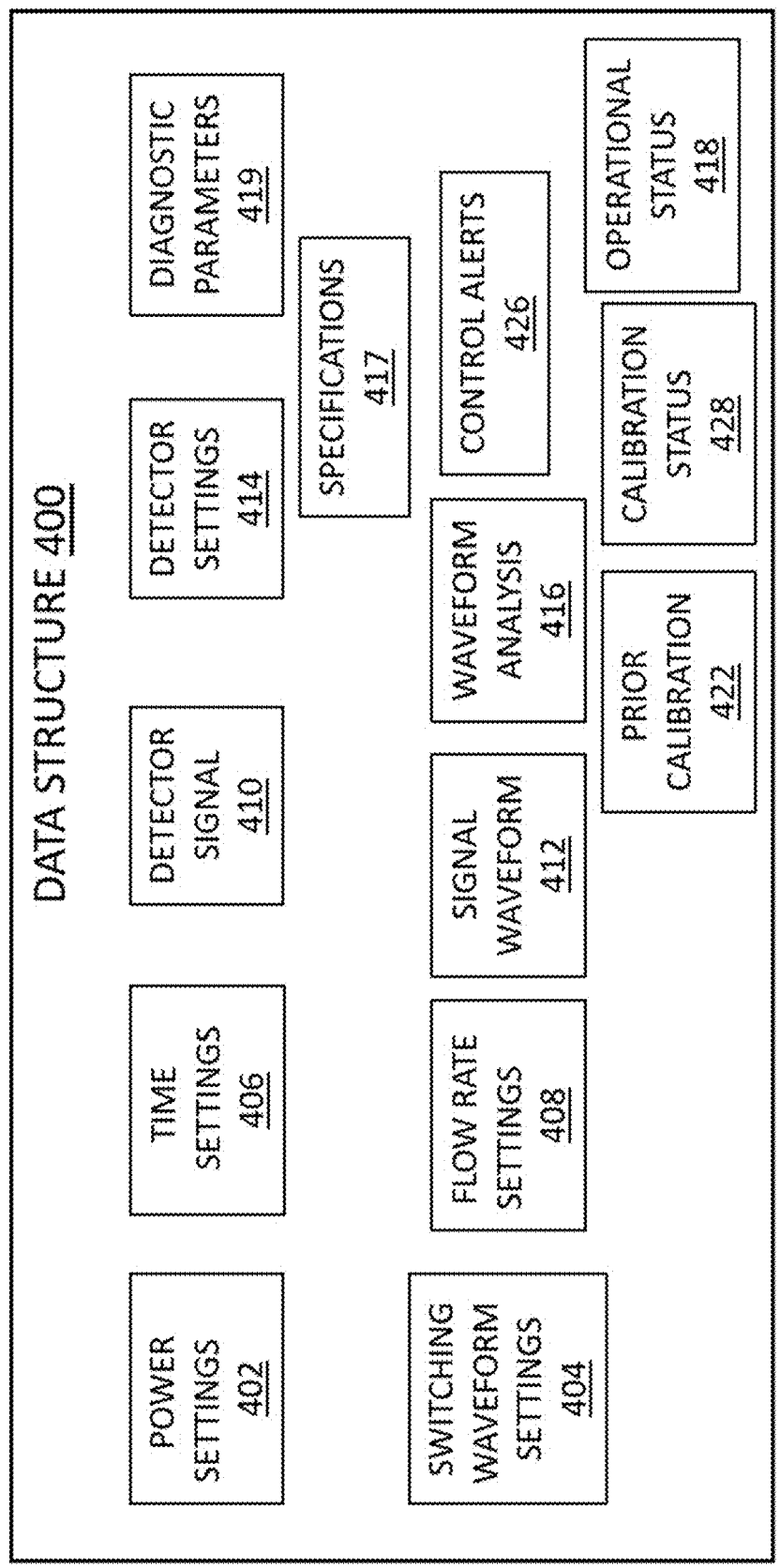
FIG. 4 is a block diagram of a data structure that may be used with the computing system shown in FIG. 1 and the method shown in FIG. 2 in accordance with one embodiment of the disclosure.

FIG. 3 is a block diagram of a software architecture 300 that may be used for performing the method 200 shown in FIG. 2 in accordance with one embodiment of the disclosure. FIG. 4 is a block diagram of a data structure 400 that may be used with the computing system 122 shown in FIG. 1 and the method 200 shown in FIG. 2 in accordance with one embodiment of the disclosure. In an embodiment, the modulating step 204 of the method 200 may be performed as a part of a computer-implemented method by processor(s) 124 executing program instructions stored as software 302 in the memory device(s) 126. In an embodiment, the processor(s) 124 perform the modulating step 204 by executing the program instructions encoded in a modulating module 304 of the software 302.

In an embodiment, the processor(s) 124 of the optical particle analyzer 100 is/are programmed to modulate the power applied to the source of EMR 102 from the first power level to the second power level. In embodiments for which the source of EMR 102 includes the laser, the processor(s) 124 is/are programmed to modulate the power applied to the laser from the first power level to the second power level. In an embodiment, to modulate the power applied to the source of EMR 102, the processor(s) 124 is/are programmed to switch the power applied to the source of EMR 102 from the first power level to the second power level. In embodiments for which the source of EMR 102 includes the laser, the processor(s) 124 is/are programmed to switch the power applied to the laser from the first power level to the second power level. In an embodiment, values of the first and second power levels are defined by the user 130 of the optical particle analyzer 100 prior to or concurrently with the performance of the modulating step 204. In an embodiment, the values of the first and second power levels are stored in memory device(s) 126 in a power settings block 402 of the data structure 400. In an embodiment, the processor(s) 124 read the data encoding the values for the first and second power levels from the power settings block 402 prior to or concurrently with executing the program instructions stored in the modulating module 304 for the modulating step 204.

In an embodiment, the modulating step 204 of the method 200 shown in FIG. 2 includes a switching step. The switching step may include switching the power applied to the source of EMR 102 from the first power level to the second power level. In an embodiment, the switching step includes switching the power applied to the source of EMR 102 according to a switching waveform. In an embodiment, the switching waveform is, or can be approximated as, a square wave. In an embodiment, the switching waveform has a frequency, a duty cycle, a first switching amplitude corresponding to the first power level, and a second switching amplitude corresponding to the second power level. In embodiments for which the source of EMR 102 includes the laser, the switching step includes switching the power applied to the laser from the first power level to the second power level. In an embodiment, switching the power applied to the laser may include switching the power applied to the laser according to the switching waveform. In an embodiment, the frequency of the switching waveform is 100 mHz, such as between 90 mHz and 110 mHz. In an embodiment, the frequency of the switching waveform is 250 mHz, such as between 240 mHz and 260 mHz.

In an embodiment, the switching step may be performed as a part of a computer-implemented method by processor(s) 124 executing program instructions stored as software 302 in the memory device(s) 126. In an embodiment, the processor(s) 124 perform the switching step by executing the program instructions encoded in a switching module 305 of the software 302.

In an embodiment, to switch the power applied to the source of EMR 102 or the laser, the processor(s) 124 is/are programmed to switch a flow of electric current from a power supply (e.g., power supply 142, shown in FIG. 1) to the drive circuitry 136 according to the switching waveform. In an embodiment, values for the frequency, the duty cycle, the first switching amplitude, and the second switching amplitude for the switching waveform are defined by the user 130 of the optical particle analyzer 100 prior to or concurrently with the performance of the modulating step 204. In an embodiment, the values for the frequency, the duty cycle, the first switching amplitude, and the second switching amplitude for the switching waveform are stored in a switching waveform settings block 404 of the data structure 400. In an embodiment, the processor(s) 124 read the data encoding the values for the frequency, the duty cycle, the first switching amplitude, and the second switching amplitude for the switching waveform from the switching waveform settings block 404 prior to or concurrently with executing the program instructions stored in the switching module 305 for the switching step.

In an embodiment, the modulating step 204 of the method 200 includes a maintaining step. The maintaining step may include maintaining the power applied to the source of EMR 102 at the second power level for a time selected over the range of 1 nanosecond (ns) to 10 milliseconds (ms). In an embodiment, the maintaining step includes maintaining the power applied to the source of EMR 102 at the second power level for a time selected over the range of 10 ms to 1 second (s). In embodiments for which the source of EMR 102 includes the laser, the maintaining step includes maintaining the power applied to the laser at the second power level for a time selected over the range of 1 ns to 10 ms. In an embodiment, the maintaining step includes maintaining the power applied to the laser at the second power level for a time selected over the range of 10 ms to 1 s.

In an embodiment, the maintaining step may be performed as a part of a computer-implemented method by processor(s) 124 executing program instructions stored as software 302 in the memory device(s) 126. In an embodiment, the processor(s) 124 perform the maintaining step by executing the program instructions encoded in a maintaining module 306 of the software 302.

In an embodiment, to maintain the power applied to the source of EMR 102 at the second power level for a time selected over the range of 1 nanoseconds (ns) to 10 milliseconds (ms) or for a time selected over the range of 10 ms to 1 seconds (s), the processor(s) 124 is/are programmed to maintain a flow of electric current from the power supply 142 to the drive circuitry 136. In an embodiment, a value for the time to maintain the power applied to the source of EMR 102 at the second power level is defined by the user 130 of the optical particle analyzer 100 prior to or concurrently with the performance of the modulating step 204. In an embodiment, the value for the time to maintain the power applied to the source of EMR 102 at the second power level is stored in a time settings block 406 of the data structure 400. In an embodiment, the processor(s) 124 read the data encoding the value for the time to maintain the power applied to the source of EMR 102 at the second power level from the time settings block 406 prior to or concurrently with executing the program instructions stored in the maintaining module 306 for the maintaining step.

In embodiments for which the chamber 106 includes the flow chamber, the method 200 may include a flowing step. In an embodiment, the flowing step includes flowing the sample medium 108 including the fluid through the flow chamber. In an embodiment, the flowing step includes flowing the sample medium 108 including the fluid and including particles through the flow chamber. In an embodiment, the flowing step includes a filtering step. In an embodiment, the filtering step includes filtering the sample medium 108 including the fluid. In an embodiment, the filtering step includes filtering the sample medium 108 including the fluid upstream of the flow chamber. In an embodiment, the flowing step includes flowing the sample medium 108 including the fluid through the flow chamber during the modulating step 204. In an embodiment, the method 200 is performed in the absence of filtering the sample medium. In an embodiment, the method 200 is performed in the absence of flowing the sample medium. In an embodiment, the method 200 is performed in the absence of flowing the sample medium and in the absence of filtering the sample medium.

In an embodiment, the flowing step may be performed as a part of a computer-implemented method by processor(s) 124 executing program instructions stored as software 302 in the memory device(s) 126. In an embodiment, the processor(s) 124 perform the flowing step by executing the program instructions encoded in a flowing module 307 of the software 302.

In an embodiment, to flow the sample medium 108 including the fluid through the flow chamber, the processor(s) 124 is/are programmed to control a flow rate of the flow system 109. In an embodiment, a value for the flow rate is defined by the user 130 of the optical particle analyzer 100 prior to or concurrently with the performance of the modulating step 204. In an embodiment, the value for the flow rate for the flow system 109 is stored in the flow rate settings block 408 of the data structure 400. In an embodiment, the processor(s) 124 read the data encoding the value for the flow rate from the flow rate settings block 408 prior to or concurrently with executing the program instructions stored in the flowing module 307 for the flowing step.

The method 200 shown in FIG. 2 includes an inducing step 206. The inducing step 206 includes inducing a detector signal waveform. In an embodiment, the inducing step 206 may include inducing the detector signal waveform in response to the modulating step 204. In an embodiment, the inducing step 206 may include a step of first receiving, by the detector 118, the scattered radiation 119 from the beam of EMR 104. In an embodiment, the first receiving step may include receiving, by the detector 118, the scattered radiation 119 from the beam of EMR 104 at a first radiant power level corresponding to the first power level applied to the source of EMR 102. In embodiments for which the source of EMR 102 includes the laser, the first receiving step may include receiving, by the detector 118, the scattered radiation 119 from the laser beam at the first radiant power level corresponding to the first power level applied to the laser.

In an embodiment, the inducing step 206 may include a step of second receiving, by the detector 118, the scattered radiation 119 from the beam of EMR 104. In an embodiment, the second receiving step may be performed in method 200 after the first receiving step. In an embodiment, the second receiving step may include receiving, by the detector 118, the scattered radiation 119 from the beam of EMR 104 at a second radiant power level corresponding to the second power level applied to the source of EMR 102. In embodiments for which the source of EMR 102 includes the laser, the second receiving step may include receiving, by the detector 118, the scattered radiation 119 from the laser beam at the second radiant power level corresponding to the second power level applied to the laser.

In an embodiment, the first and/or second receiving steps may be performed as a part of a computer-implemented method by processor(s) 124 executing program instructions stored as software 302 in the memory device(s) 126. In an embodiment, the processor(s) 124 perform the first receiving step by executing the program instructions encoded in a first receiving module 308 of the software 302.

In an embodiment, concurrently with or after the detector 118 first receives the scattered radiation 119 from the source of EMR 102 or the laser at the first radiant power level, the resultant detector signal 134 undergoes analog-to-digital conversion either before or after the detector signal 134 passes through the amplification circuitry 132. In an embodiment, the processor(s) 124 is/are programmed to receive the detector signal 134 converted to digital form. In an embodiment, the processor(s) 124 is/are programmed to decode the detector signal 134. In an embodiment, the processor(s) 124 is/are programmed to store the information encoded by the detector signal 134 as data in a detector signal block 410 of the data structure 400. In an embodiment, the processor(s) 124 is/are programmed to transmit the data in the detector signal block 410 to the display 150 to, for example, graphically render the detector signal waveform 502 in a human readable form. In an embodiment, the processor(s) 124 is/are programmed to store the detector signal waveform 502 as data in a signal waveform block 412 of the data structure 400.

In an embodiment, the processor(s) 124 perform the second receiving step by executing the program instructions encoded in a second receiving module 310 of the software 302. In an embodiment, concurrently with or after the detector 118 second receives the scattered radiation 119 from the source of EMR 102 or the laser at the second radiant power level, the resultant detector signal 134 undergoes analog-to-digital conversion either before or after the detector signal 134 passes through the amplification circuitry 132. In an embodiment, the detector 118 is configured to perform the first and second receiving steps by sampling the scattered radiation 119 from the source of EMR 102 or the laser beam at the first and second radiant power levels, respectively. In an embodiment, the processor(s) 124 is/are programmed to control the sampling of the detector 118 at a sampling frequency. In an embodiment, a value for the sampling frequency is defined by the user 130 of the optical particle analyzer 100 prior to or concurrently with the performance of the modulating step 204. In an embodiment, the value for the sampling frequency for the detector 118 is stored in a detector settings block 414 of the data structure 400. In an embodiment, the processor(s) 124 read the data encoding the value for the sampling frequency from the detector settings block 414 prior to or concurrently with executing the program instructions stored in the modulating module 304 for the modulating step 204.

In an embodiment, the second receiving step may include a changing step. In an embodiment, the changing step may include changing an energization state of the amplification circuitry 132 from a first state (e.g., a first energization state whereby the amplification circuitry 132 contains a first level of stored electrical energy) to a second state (e.g., a second energization state whereby the amplification circuitry 132 contains a second level of stored electrical energy). In an embodiment, the first level of stored energy for the first state is less than the second level of stored energy for the second state. In an embodiment, the first level of stored energy for the first state is greater than the second level of stored energy for the second state. In an embodiment, the first state corresponds to the first radiant power level for the scattered radiation 119 from the source of EMR 102. In embodiments for which the source of EMR 102 includes the laser, the first state corresponds to the first radiant power level for the scattered radiation 119 from the laser. In an embodiment, the second state corresponds to the second radiant power level for the scattered radiation 119 from the source of EMR 102. In embodiments for which the source of EMR 102 includes the laser, the second state corresponds to the second radiant power level for the scattered radiation 119 from the laser.

Figure 5:
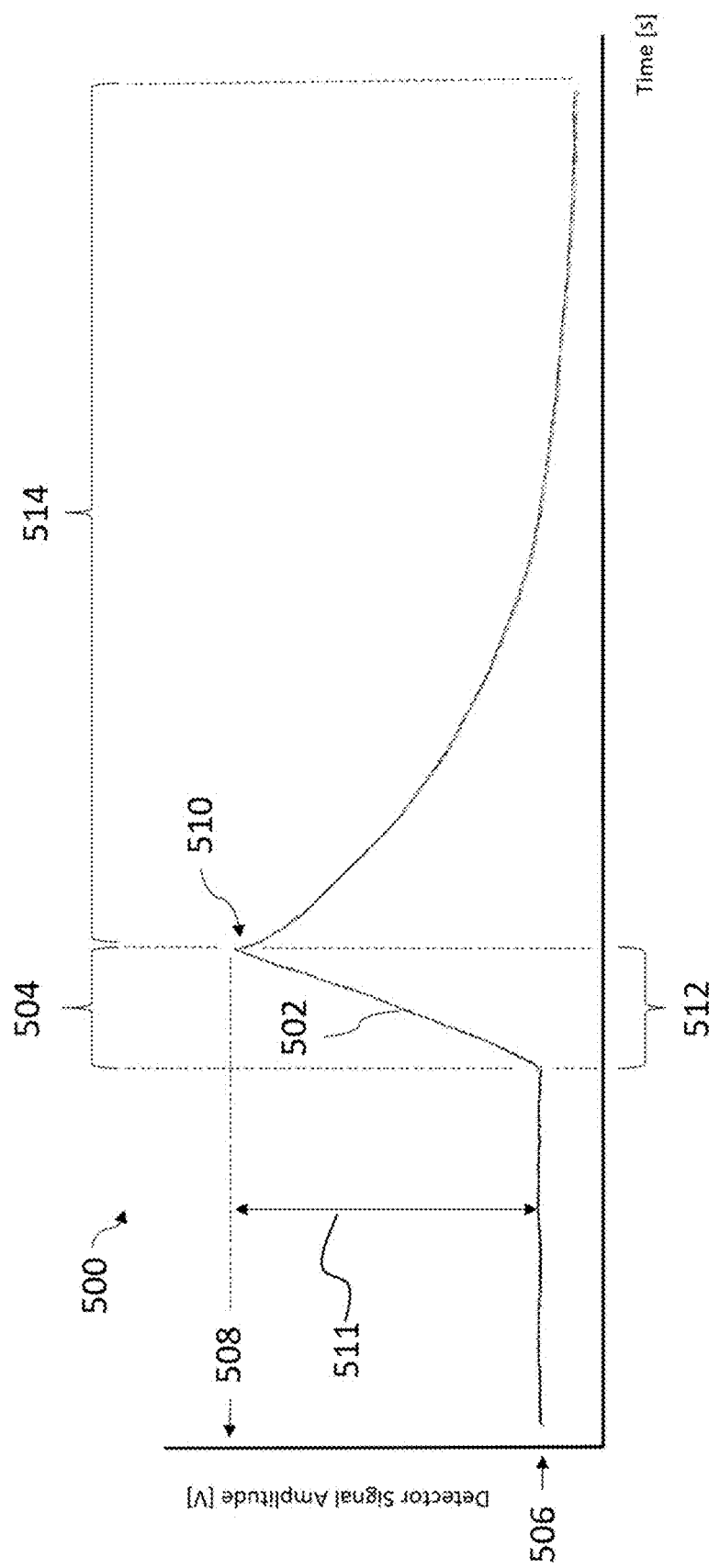
FIG. 5 is a plot of a detector signal waveform induced in the method shown in FIG. 2 in accordance with one embodiment of the disclosure.

FIG. 5 is a representative plot 500 of a detector signal waveform 502 induced in the method 200 shown in FIG. 2 in accordance with one embodiment of the disclosure. In an embodiment, the detector signal waveform 502 has a leading edge 504. In an embodiment, the detector signal waveform 502 has a first signal amplitude 506 and a second signal amplitude 508. In an embodiment, the leading edge 504 of the detector signal waveform 502 is defined by a leading edge function.

In an embodiment, the leading edge 504 of the detector signal waveform 502 corresponds to the change of the energization state of the amplification circuitry 132 from the first state to the second state. For the example detector signal waveform 502 plot 500 shown in FIG. 5, the leading edge 504 corresponds to the second state having the higher level of stored electrical energy as compared to the first state as a consequence of the changing step.

In an embodiment, the detector signal waveform 502 includes a peak 510. For the example detector signal waveform 502 plot 500 shown in FIG. 5, the peak 510 has an amplitude that is equal to the second amplitude 508. In an embodiment, the amplitude 511 of peak 510 of the detector signal waveform 502 shown in FIG. 5 corresponds to a difference in two detector signal 134 amplitudes. For the example detector signal waveform 502 plot 500 shown in FIG. 5, the amplitude of peak 510 is equal to the difference between the second signal amplitude 508 and the first signal amplitude 506. In an embodiment, the amplitude of peak 510 of the detector signal waveform 502 corresponds to a difference in detector signal 134 amplitudes between: (a) the scattered radiation 119 detected by the detector 118 from the beam of EMR at the first radiant power level from the source of EMR 102 having the applied power level at the first power level; and (b) the scattered radiation 119 detected by the detector 118 from the beam of EMR at the second radiant power level from the source of EMR 102 having the applied power level at the second power level. In embodiments for which the source of EMR 102 includes the laser, the amplitude of peak 510 of the detector signal waveform 502 corresponds to a difference in detector signal 134 amplitudes between: (a) the scattered radiation 119 detected by the detector 118 from the laser beam at the first radiant power level from the laser having the applied power level at the first power level; and (b) the scattered radiation 119 detected by the detector 118 from the laser beam at the second radiant power level from the laser having the applied power level at the second power level.

The method 200 shown in FIG. 2 includes an analyzing step 208. The analyzing step 208 includes analyzing the detector signal waveform (e.g., detector signal waveform 502). In an embodiment, the analyzing step 208 may include analyzing the detector signal waveform to determine a value of at least one diagnostic parameter for the optical particle analyzer (e.g., optical particle analyzer 100). In an embodiment, the diagnostic parameter may be associated with one or more of the source of EMR 102, the optical assembly 112, the chamber 106, the detector 118, and the optical collection system 120. In an embodiment, the diagnostic parameter may be associated with the amplification circuitry 132. In an embodiment, the diagnostic parameter may be associated with the drive circuitry 136. In embodiments for which the source of EMR 102 includes the laser, the diagnostic parameter may be associated with one or more of the laser, the optical assembly 112, the chamber 106, the detector 118, and the optical collection system 120. In embodiments for which the chamber 106 includes the flow chamber, the diagnostic parameter may be associated with one or more of the source of EMR 102, the optical assembly 112, the flow chamber, the detector 118, and the optical collection system 120. In embodiments for which the chamber 106 includes the flow chamber and for which the source of EMR 102 includes the laser, the diagnostic parameter may be associated with one or more of the laser, the optical assembly 112, the flow chamber, the detector 118, and the optical collection system 120.

In an embodiment, the analyzing step 208 includes determining a value of the first signal amplitude 506 of the detector signal waveform 502. In an embodiment, the analyzing step 208 includes determining a value of the second signal amplitude 508 of the detector signal waveform 502. In an embodiment, the analyzing step 208 includes determining a value of a difference between the values of the first 506 and the second 508 signal amplitudes of the detector signal waveform 502.

In an embodiment, the analyzing step 208 includes determining the value of the amplitude 511 of the peak 510 of the detector signal waveform 502. For the example detector signal waveform 502 plot 500 shown in FIG. 5, the amplitude of peak 510 is determined by determining a value of the difference between the second signal amplitude 508 and the first signal amplitude 506. In an embodiment, the value of the amplitude of peak 510 of the detector signal waveform 502 determined in the analyzing step 208 corresponds to the difference in detector signal 134 amplitudes between: (a) the scattered radiation 119 detected by the detector 118 from the beam of EMR at the first radiant power level from the source of EMR 102 having the applied power level at the first power level; and (b) the scattered radiation 119 detected by the detector 118 from the beam of EMR at the second radiant power level from the source of EMR 102 having the applied power level at the second power level. In embodiments for which the source of EMR 102 includes the laser, the value of amplitude of peak 510 of the detector signal waveform 502 determined in the analyzing step 208 corresponds to the difference in detector signal 134 amplitudes between: (a) the scattered radiation 119 detected by the detector 118 from the laser beam at the first radiant power level from the laser having the applied power level at the first power level; and (b) the scattered radiation 119 detected by the detector 118 from the laser beam at the second radiant power level from the laser having the applied power level at the second power level.

In an embodiment, the value of the amplitude of the peak 510 of the detector signal waveform 502 determined in the analyzing step 208 is associated with (e.g., and is indicative of) an operational condition of the source of EMR 102, the chamber 106, the optical assembly 112, the optical collection system 120, the detector 118, and the amplification circuitry 132 of the optical particle analyzer 100. In embodiments for which the source of EMR 102 includes the laser, the value of the amplitude of the peak 510 of the detector signal waveform 502 determined in the analyzing step 208 is associated with an operational condition of the laser and the operational condition of the chamber 106, the optical assembly 112, the optical collection system 120, the detector 118, and the amplification circuitry 132. In embodiments for which the source of EMR 102 includes the laser and the chamber 106 includes the flow chamber, the value of the amplitude of the peak 510 of the detector signal waveform 502 determined in the analyzing step 208 is associated with an operational condition of the flow chamber, the operational condition of the laser, and the operational condition of the optical assembly 112, the optical collection system 120, the detector 118, and the amplification circuitry 132. In an embodiment, a value of the amplitude of the peak 510 determined in the analyzing step 208 that is equal to a peak 510 amplitude value previously determined and stored at or about the time of the last calibration indicates:

A healthy source of EMR 102
A healthy chamber 106
A healthy optical assembly 112
A healthy optical collection system 120
A healthy detector 118
Healthy amplification circuitry 132

In an embodiment, a value of the amplitude of the peak 510 determined in the analyzing step 208 that is less than a peak 510 amplitude value previously determined and stored at or about the time of the last calibration indicates at least one of:

A possibly unstable or failed source of EMR 102
A possibly contaminated, misaligned, or failed optical assembly 112
A possibly contaminated or failed optical collection system 120
A possibly contaminated or failed detector 118
Possibly failed amplification circuitry 132

In an embodiment, a value of the amplitude of the peak 510 determined in the analyzing step 208 that is greater than a peak 510 amplitude value previously determined and stored at or about the time of the last calibration indicates at least one of:

A possibly misaligned optical assembly 112
Possibly failed amplification circuitry 132

In an embodiment, the at least one diagnostic parameter includes an elapsed time (e.g., elapsed time 512 shown in FIG. 5) for the leading edge 504. In an embodiment, the analyzing step 208 includes determining the elapsed time 512 for the leading edge 504. In an embodiment, the elapsed time 512 for the leading edge 504 is associated with an operational condition of the drive circuitry 136. In an embodiment, the at least one diagnostic parameter includes the leading edge function that defines the leading edge 504 of the detector signal waveform 502. In an embodiment, the analyzing step 208 includes determining the leading edge function of the leading edge 504.

In an embodiment, the leading edge function is associated with an operational condition of the source of EMR 102, the optical assembly 112, the chamber 106, the detector 118, and the optical collection system 120 of the optical particle analyzer 100. In embodiments for which the source of EMR 102 includes the laser, the leading edge function determined in the analyzing step 208 is associated with an operational condition of the laser and the operational condition of the chamber 106, the optical assembly 112, the optical collection system 120, the detector 118, and the amplification circuitry 132. In embodiments for which the source of EMR 102 includes the laser and the chamber 106 includes the flow chamber, the leading edge function determined in the analyzing step 208 is associated with an operational condition of the flow chamber, the operational condition of the laser, and the operational condition of the optical assembly 112, the optical collection system 120, the detector 118, and the amplification circuitry 132.

In an embodiment, the analyzing step 208 may be performed as a part of a computer-implemented method by processor(s) 124 executing program instructions stored as software 302 in the memory device(s) 126. In an embodiment, the processor(s) 124 perform the analyzing step 208 by executing the program instructions encoded in an analyzing module 314 of the software 302.

In an embodiment, for the analyzing step 208, the processor(s) 124 is/are programmed to analyze the scattered radiation detector signal waveform 502 induced by the modulation of the power applied to the source of EMR 102 or the laser. In an embodiment, to analyze the scattered radiation detector signal waveform 502 induced by the modulation of the power applied to the source of EMR 102 or the laser, the processor(s) 124 is/are programmed to determine: (a) the value of the first signal amplitude 506; (b) the value of the second signal amplitude 508; and (c) the value of the difference between the first 506 and second 508 amplitude values of the detector signal waveform 502. In an embodiment, to analyze the scattered radiation detector signal waveform 502 induced by the modulation of the power applied to the source of EMR 102 or the laser, the processor(s) 124 is/are programmed to read the detector signal waveform 502 data stored in the signal waveform block 412 of the data structure 400. In an embodiment, the processor(s) 124 is/are programmed to store the determined values of the first 506 and second 508 amplitude values of the detector signal waveform 502 and the determined value of the difference between the first 506 and second 508 amplitude values in a waveform analysis block 416 of the data structure 400.

In an embodiment, to analyze the scattered radiation detector signal waveform 502 induced by the modulation of the power applied to the source of EMR 102 or the laser, the processor(s) 124 is/are programmed to determine the elapsed time 512 for the leading edge 504 of the detector signal waveform 502. In an embodiment, to analyze the scattered radiation detector signal waveform 502 induced by the modulation of the power applied to the source of EMR 102 or the laser, the processor(s) 124 is/are programmed to determine the leading edge function of the leading edge 504 of the detector signal waveform 502. In an embodiment, to determine the leading edge function of the leading edge 504, the processor(s) 124 utilize one or more curve fitting algorithms including, for example and without limitation, an exponential curve fitting algorithm. In an embodiment, the processor(s) 124 is/are programmed to store the determined value of the elapsed time 512 and the determined leading edge function for the leading edge 504 of the detector signal waveform 502 in the waveform analysis block 416 of the data structure 400.

In an embodiment, the processor(s) 124 is/are programmed to determine leading edge function parameters of the leading edge function. For example, for a linear curve fitting algorithm (e.g., $y=m*x+b$) for the leading edge function, the processor(s) 124 may determine the values of the function parameters m and b. For example, for an exponential growth curve fitting algorithm (e.g., $y=P*e^{rx}$) for the leading edge function, the processor(s) 124 may determine the values of the function parameters P and r. In an embodiment, the processor(s) 124 is/are programmed to store the determined values of the leading edge function parameters in the waveform analysis block 416 of the data structure 400.

In an embodiment, the processor(s) 124 is/are programmed to determine an operational condition of one or more of the component(s) of the optical particle analyzer (e.g., those component(s) shown and described above for the optical particle analyzer 100). In an embodiment, the processor(s) 124 determine the operational condition of the component(s) of the optical particle analyzer 100 based on the determined values of the diagnostic parameters. In an embodiment, determining, by the processor(s) 124, the operational condition of the component(s) of the optical particle analyzer 100 may include comparing the determined value(s) of the diagnostic parameter(s) with one or more specification value(s) for the respective optical particle analyzer 100 component(s). In an embodiment, user 130-predetermined values for specification value(s) for the respective optical particle analyzer 100 component(s) are stored in a specifications block 417 of the data structure 400. In an embodiment, results of the operational conditions of the component(s) of the optical particle analyzer 100 are stored, by the processor(s) 124, in an operational status block 418 of the data structure 400.

The method 200 shown in FIG. 2 includes a determining step 210. The determining step 210 includes determining a calibration status of the optical particle analyzer (e.g., optical particle analyzer 100). In an embodiment, the calibration status of the optical particle analyzer 100 is determined based on the one or more determined values of the at least one diagnostic parameter determined in the analyzing step 208. In an embodiment, the determining step 210 includes a comparing step. In an embodiment, the comparing step includes comparing the one or more determined values of the at least one diagnostic parameter with corresponding values of at least one of the respective calibration parameter determined at a prior calibration of the optical particle analyzer 100. In an embodiment, the comparing step includes determining a value of a difference between the one or more determined values of the at least one diagnostic parameter and the corresponding values of each respective calibration parameter determined at the prior calibration. In an embodiment, the determining step 210 includes determining the calibration status of the optical particle analyzer 100 based on the value (e.g., determined in the comparing step) of the difference between the one or more determined values of the at least one diagnostic parameter and the corresponding values of each respective calibration parameter determined at the prior calibration.

In an embodiment, the determining step 210 may be performed as a part of a computer-implemented method by processor(s) 124 executing program instructions stored as software 302 in the memory device(s) 126. In an embodiment, the processor(s) 124 perform the determining step 210 by executing the program instructions encoded in a determining module 316 of the software 302. In an embodiment, the processor(s) 124 is/are programmed to determine the value of the at least one diagnostic parameter based on the analysis of the detector signal waveform 502 in the analysis step 208. In an embodiment, for determining the value of the at least one diagnostic parameter, the processor(s) 124 is/are programmed to read one or more of: the first 506 and second 508 amplitude values, the value of the difference between the first 506 and second 508 amplitude values, the elapsed time 512 value, the leading edge function, and the leading edge function parameters, from the waveform analysis block 416 of the data structure 400. In an embodiment, after performing the determining step 210, the processor(s) 124 is/are programmed to store the determined value(s) of the at least one diagnostic parameter in a diagnostic parameter block 419 of the data structure 400.

Figure 6:
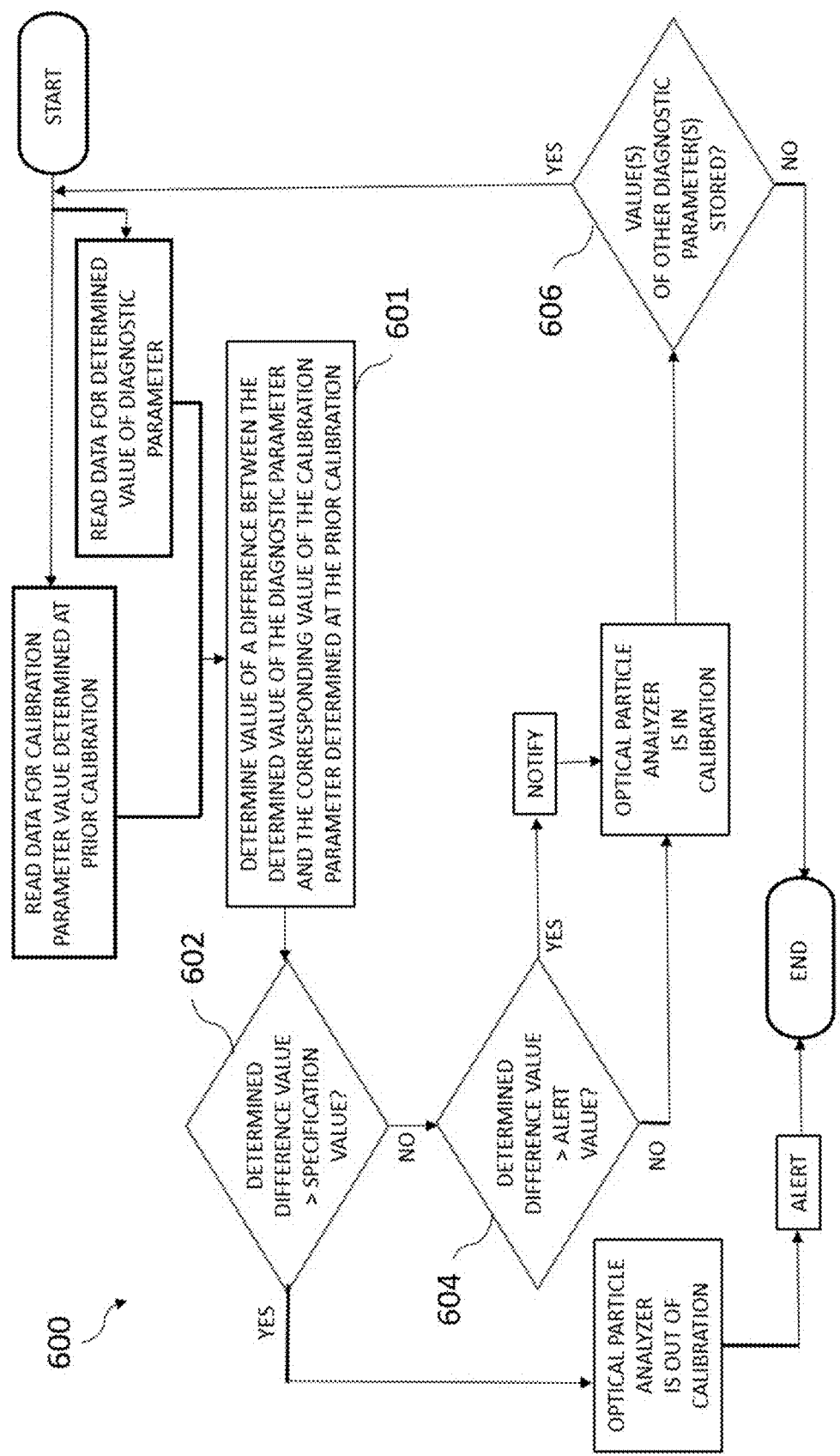
FIG. 6 is a state diagram representation of a use case for the method shown in FIG. 2 in accordance with one embodiment of the disclosure.

FIG. 6 is a state diagram 600 representation of a use case for the method 200 shown in FIG. 2 in accordance with one embodiment. In an embodiment, for the comparing step, the processor(s) 124 is/are programmed to compare the one or more determined values of the at least one diagnostic parameter with corresponding values of at least one of the respective calibration parameter(s) determined at a prior calibration of the optical particle analyzer 100. Referring to FIG. 6, from a start state (e.g., following performance of the analyzing step 208 of method 200), and for a first iteration of the state diagram 600, the processor(s) 124 read the data for a determined value of the diagnostic parameter from the diagnostic parameter block 419 of the data structure 400. Either before, after, or concurrently with reading the data for a determined value of the diagnostic parameter, the processor(s) 124 read the data for a corresponding value of the respective calibration parameter determined at a prior calibration event for the optical particle analyzer 100. In an embodiment, the processor(s) 124 read the data for a corresponding value of the respective calibration parameter from a prior calibration block 422 of the data structure 400. In an embodiment, the corresponding value of the respective calibration parameter determined at the prior calibration event is the value for the same type of diagnostic parameter read in the first iteration of the state diagram 600. For example, and without limitation, in a first iteration of state diagram 600, processor(s) 124 read the value of the elapsed time 512 from the diagnostic parameter block 419 of the data structure 400. In this example, the corresponding value of the respective calibration parameter determined at the prior calibration event is the value of the elapsed time 512 determined at the prior calibration and read by the processor(s) 124 in the first iteration of state diagram 600 from the prior calibration block 422 of the data structure 400. Thus, the determined value of the difference (e.g., determined by processor(s) 124 at a block 601 shown in FIG. 6) is the difference between the presently determined value and the value determined at the prior calibration event (e.g., the same type of diagnostic parameter).

In an embodiment, the determining step 210 includes determining the calibration status of the optical particle analyzer 100 based on the value (e.g., determined in the comparing step and/or block 601) of the difference between the one or more determined values of the at least one diagnostic parameter and the corresponding values of each respective calibration parameter determined at the prior calibration. In an embodiment, the processor(s) 124 may perform a first query 602. In the first query 602, the processor(s) 124 compare the difference value determined in block 601 with a specification value stored in the specifications block 417 of the data structure 400. In an embodiment, the specification value stored in the specifications block 417 is user-defined or is manufacturer-defined prior to or concurrently with the performance of the determining step 210. In an embodiment, if the difference value determined in block 601 is greater than the specification value stored in the specifications block 417, then the determined calibration status of the optical particle analyzer 100 is out of calibration. In an embodiment, the processor(s) 124 may store the determined calibration status in a calibration status block 428 of the data structure 400. In an embodiment, the processor(s) 124 may alert the user 130 that the optical particle analyzer 100 is out of calibration. Upon determining that the calibration status of the optical particle analyzer 100 is out of calibration, the processor(s) 124 proceed to an end state of the state diagram 600.

In an embodiment, if the difference value determined in block 601 is not greater than the specification value, then the processor(s) 124 may perform a second query 604. In the second query 604, the processor(s) 124 compare the difference value determined in block 601 with an alert value stored in a control alerts block 426 of the data structure 400. In an embodiment, the alert value stored in the control alerts block 426 is defined by the user 130 of the optical particle analyzer 100 prior to or concurrently with the performance of the determining step 210. In an embodiment, if the difference value determined in block 601 is greater than the alert value stored in the control alerts block 426, then the determined calibration status of the optical particle analyzer 100 is in calibration, but with a notify status regarding an approaching out-of-calibration status. In an embodiment, the processor(s) 124 may store the determined calibration status in the calibration status block 428 of the data structure 400. In an embodiment, the processor(s) 124 may notify the user 130 that the optical particle analyzer 100 has a determined diagnostic parameter difference value that exceeds an alert value.

In an embodiment, upon determining that the calibration status of the optical particle analyzer 100 is in calibration (including in the case where the determined diagnostic parameter difference value does not exceed the alert value), the processor(s) 124 may perform a third query 606. In the third query 606, the processor(s) 124 determine whether or not values of other types of diagnostic parameters (e.g., for peak 510 amplitude where, for the first iteration of state diagram 600, the diagnostic parameter was elapsed time 512) are available to be read from the diagnostic parameters block 419 of the data structure 400. In an embodiment, if the processor(s) 124 determine that there are values of other types of diagnostic parameters available to be read from the diagnostic parameters block 419 of the data structure 400, the processor(s) 124 commence executing a second iteration of the state diagram 600. Otherwise, the processor(s) 124 proceed to the end state of the state diagram 600.

The invention can be further understood by the following non-limiting examples.

EXAMPLE 1

Check Pulses Effectiveness Investigation

An IsoAir®-310P instrument equipped with the laser as the source of EMR 102 (30 mW laser power) was used as a test instrument to perform the following experiments in Example 1 to determine what percentage of post-Bessel filter laser-on pulse is derived from light collection mirrors and what percentage is derived from a source other than the mirrors.

Figure 7A:
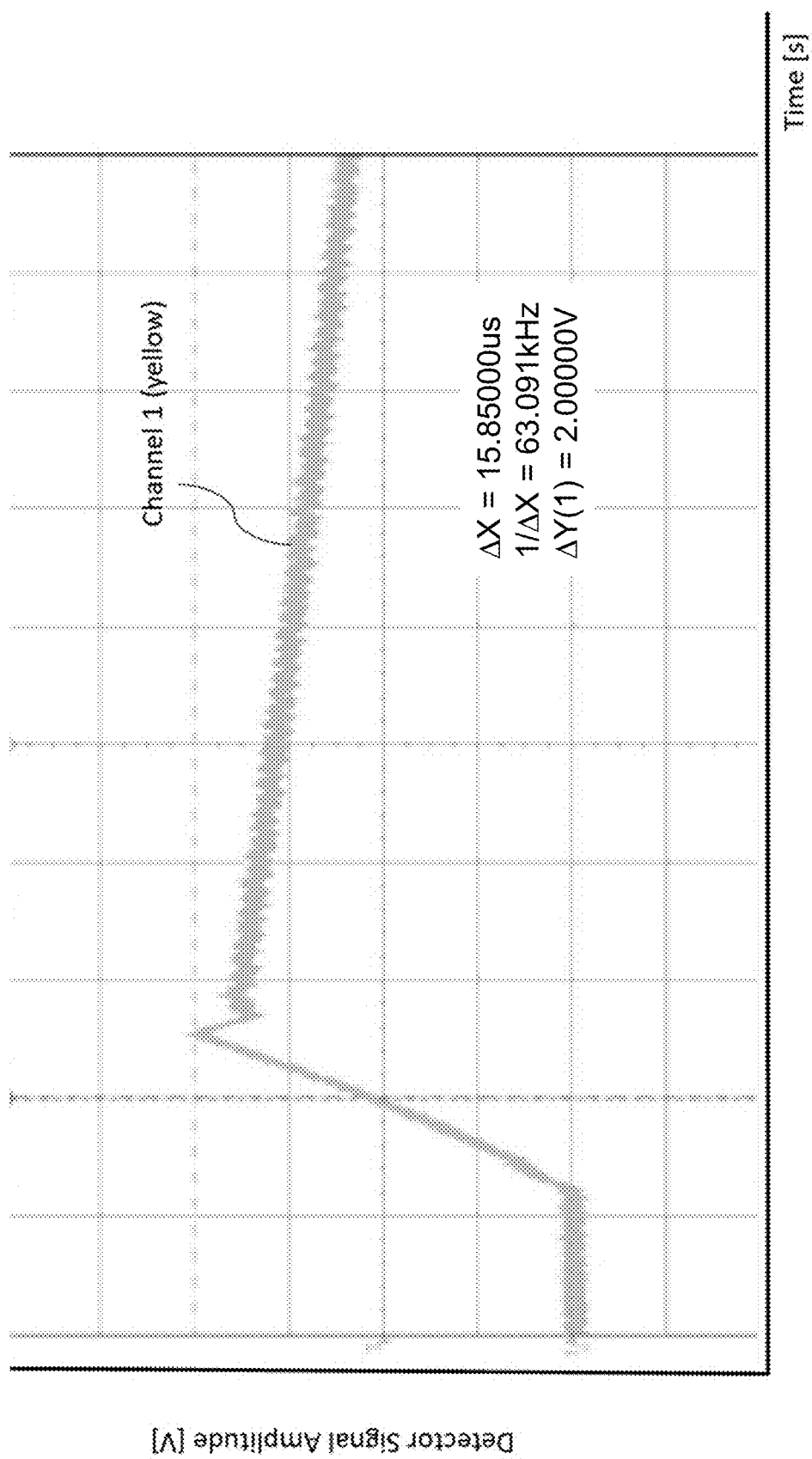
FIGS. 7A, 7B, and 7C are plots of detector signal waveforms for Example 1 of the disclosure.
Figure 7B:
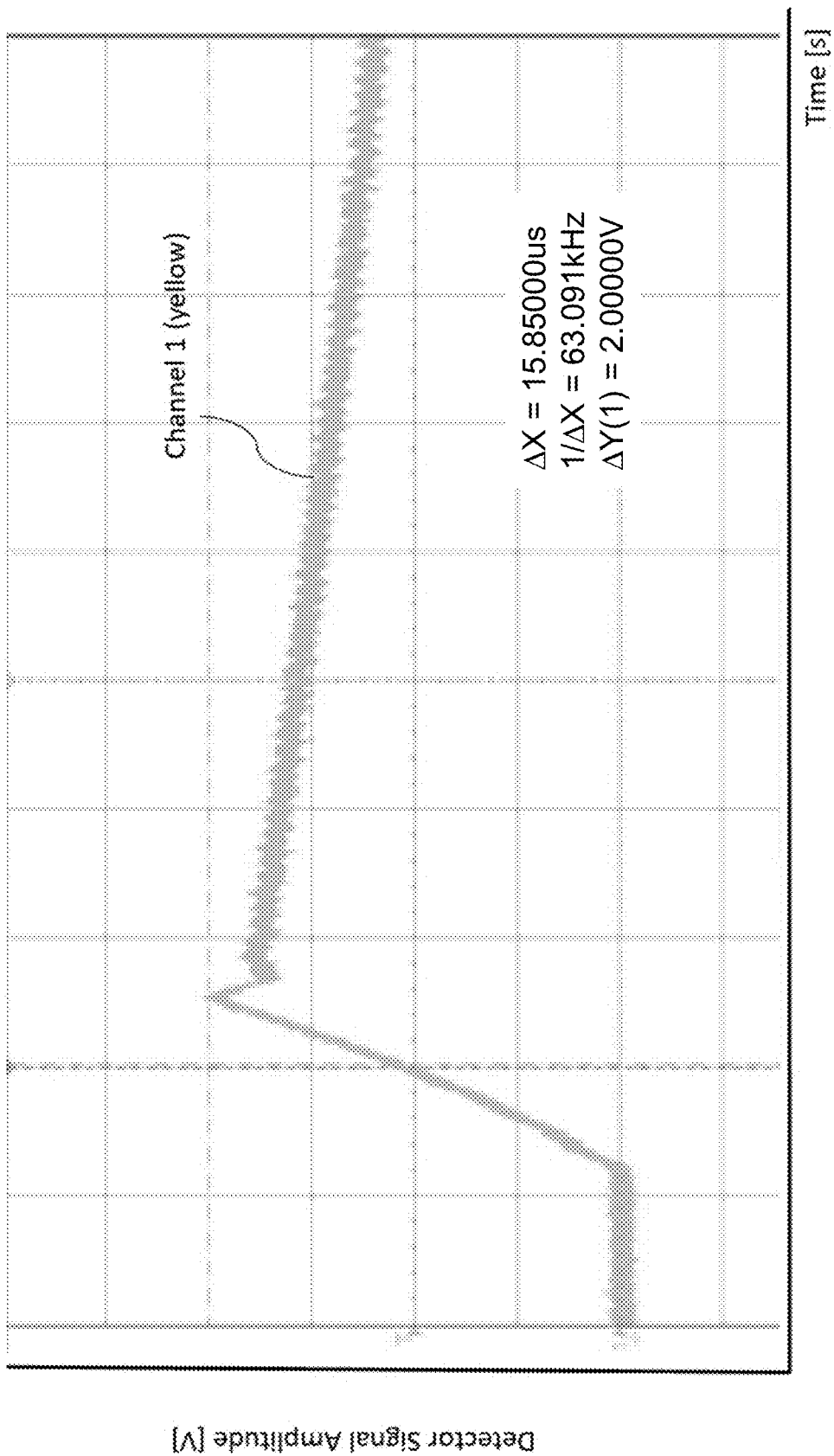
Figure 7C:
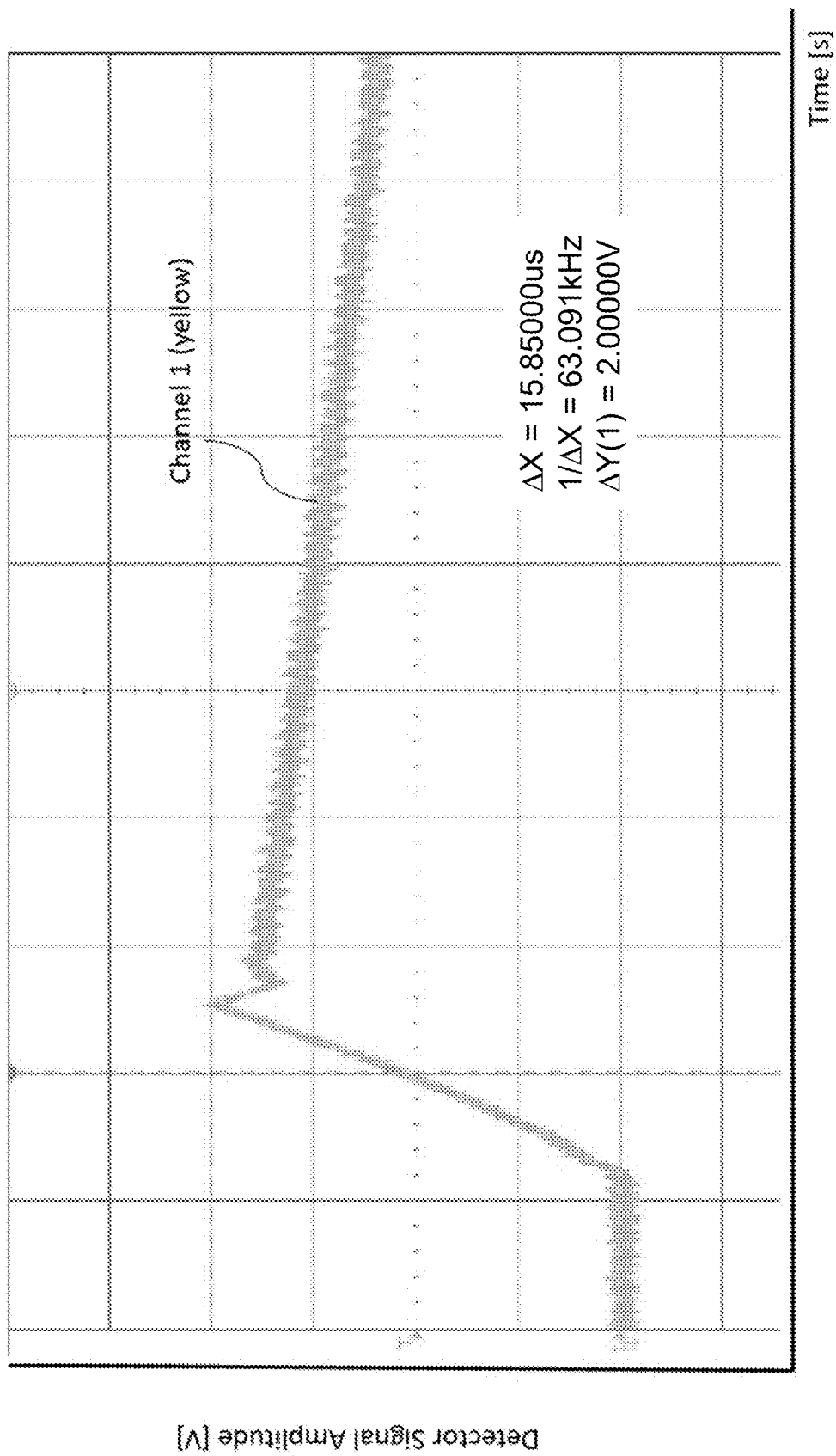

FIGS. 7A-7C are plots of detector signal waveforms for Example 1 of the disclosure. The plots shown in FIGS. 7A-7C depict detector signal waveforms for three laser-on pulses with mirrors (2.0Vp). As shown by the plots of FIGS. 7A-7C, the three measured laser power-up pulses indicate a stable and repeatable peak value of 2.0 Vdc and a laser power-up event rise-time of approximately 1.25 ms.

Figure 8A:
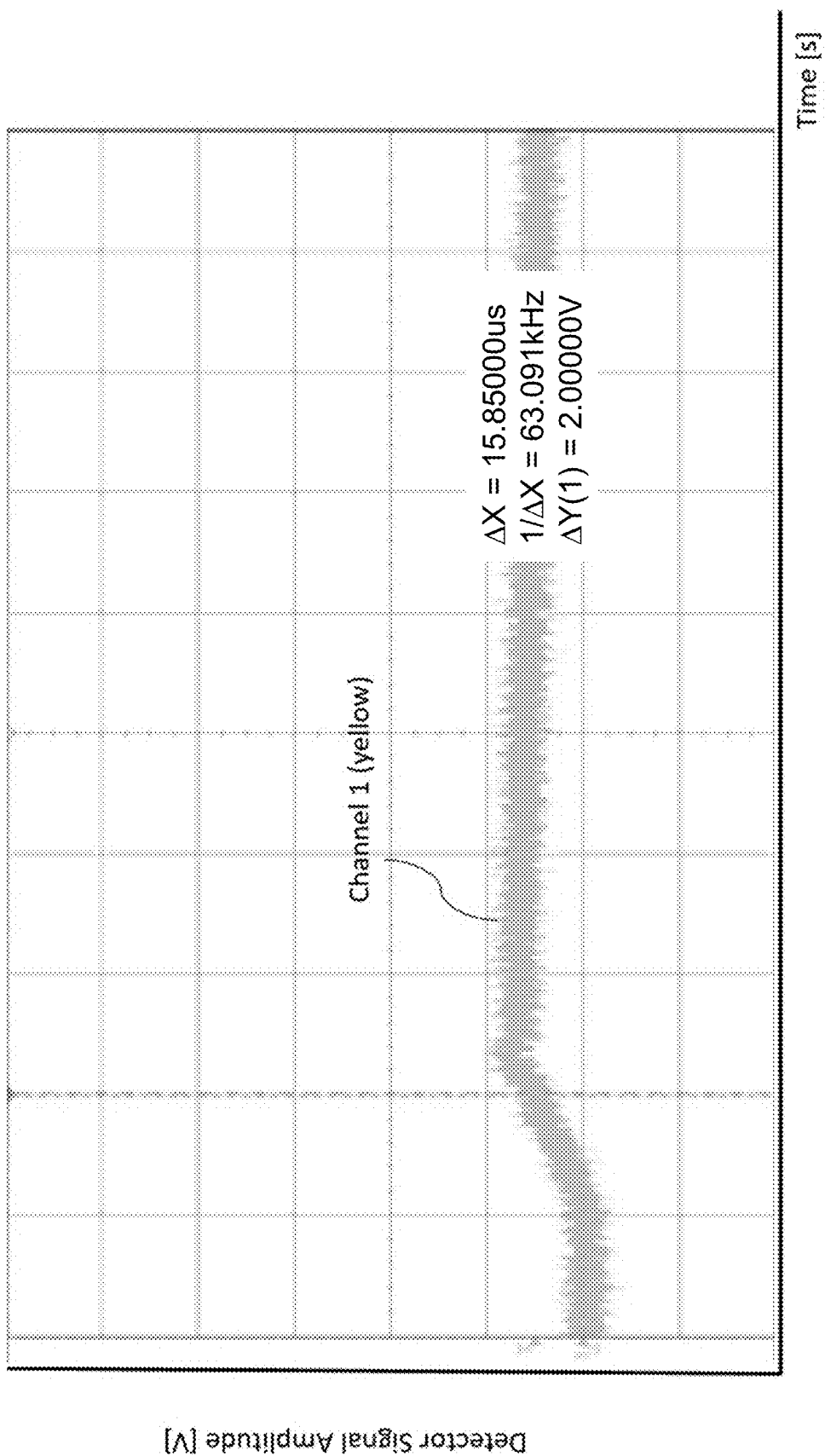
FIGS. 8A, 8B, and 8C are plots of detector signal waveforms for Example 1 of the disclosure.
Figure 8B:
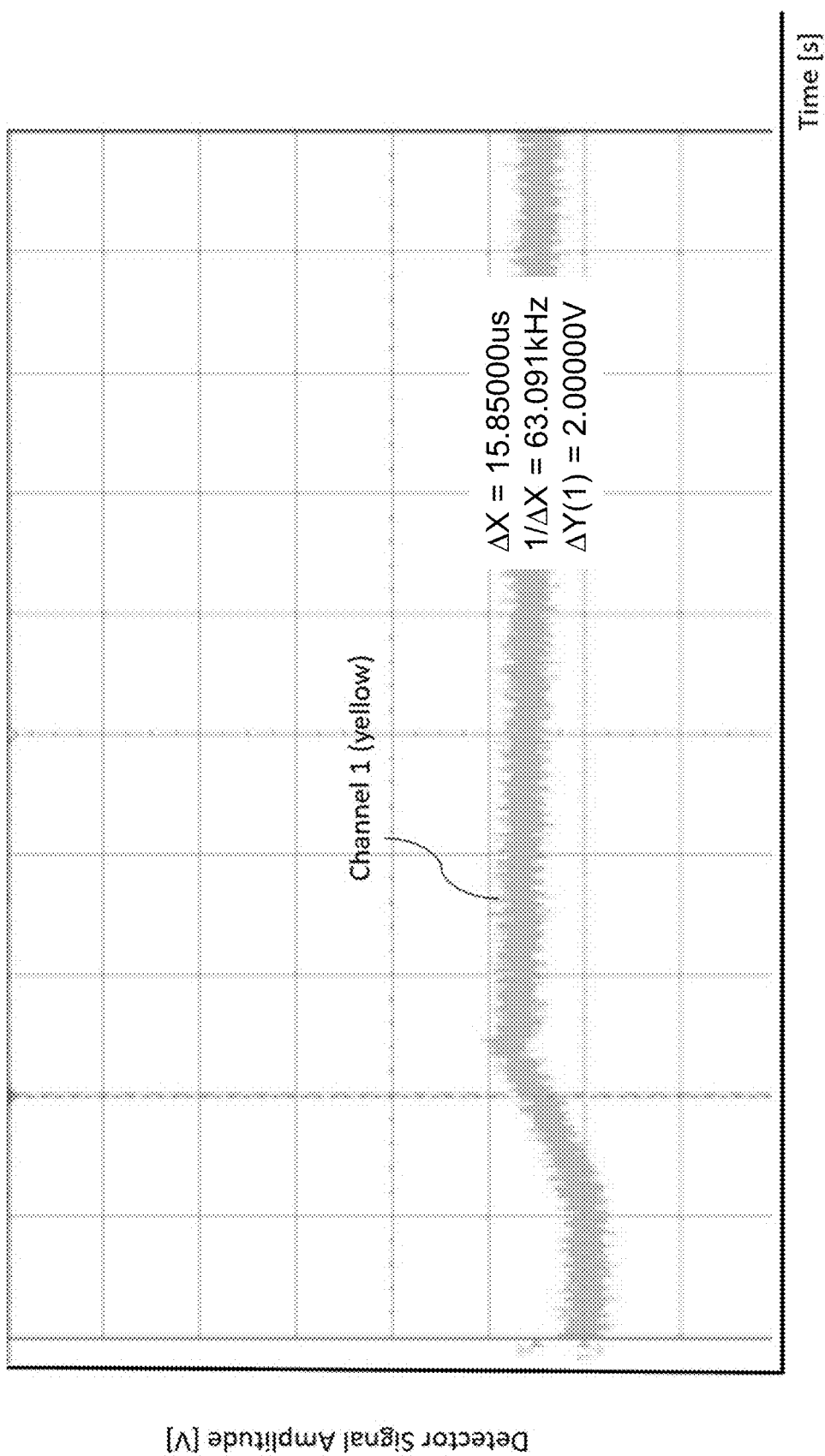
Figure 8C:
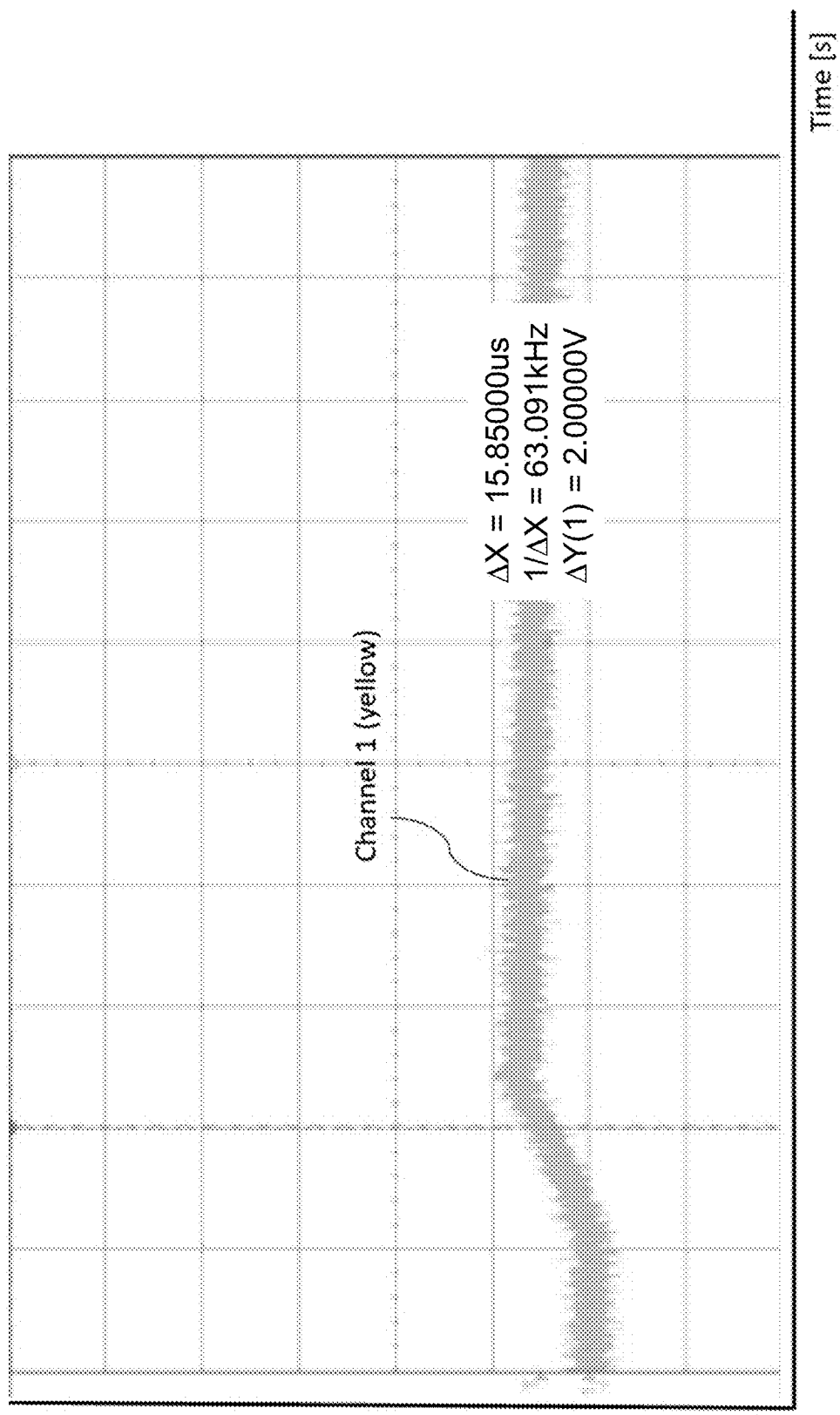

FIGS. 8A-8C are plots of detector signal waveforms for Example 1 of the disclosure. The plots shown in FIGS. 8A-8C depict detector signal waveforms for three laser-on pulses with black painted mirrors (0.20Vp). As shown by the plots of FIGS. 8A-8C, the three measured laser power-up pulses indicate a stable and repeatable peak value of 0.2 Vdc and a laser power-up event rise-time of approximately 1.25 ms. The experimental data presented in the plots of FIGS. 8A-8C indicates that 90% of the laser power-up pulse signal is generated by laser-produced scattered light energy that transfers through the optical collection system 120, before reaching the detector 118. This indicates that the laser power-up pulse signal can be effectively employed to detect light signal loss through the optical collection system 120. The light signal loss through the optical collection system 120, is typically caused by contamination depositing onto exposed optical surfaces of the optical collection system 120. Therefore, the laser power-up pulse signal can be effectively used to detect contamination of the optical collection system 120, and thus enable the user 130 to identify and/or correct the issue.

Figure 9:
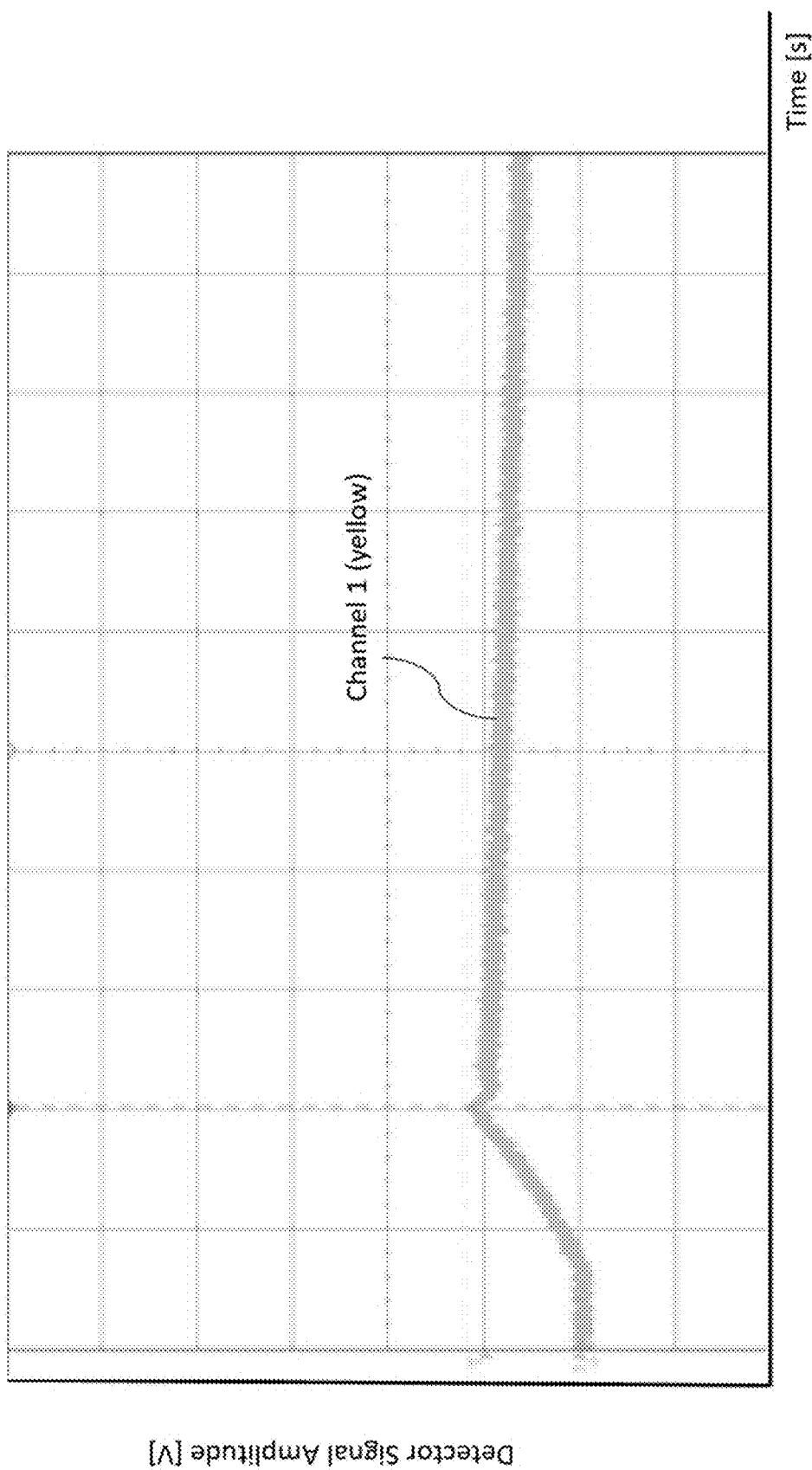
FIG. 9 is a plot of a detector signal waveform for Example 1 of the disclosure.

FIG. 9 is a plot of a detector signal waveform for Example 1 of the disclosure. The plot shown in FIG. 9 depicts a detector signal waveform for a laser-on pulse with standard mirrors (0.60Vp): beam stop side (forward scatter) 50% of total obstructed. The experimental data presented in the plot of FIG. 9 indicates that while 50% of the clear aperture (light collecting ability) of the optical collection system 120 was removed, 70% of the entire optical collection system 120 laser power-up pulse signal was lost. This indicates that the scattered light energy from the flow chamber 106 is forward scatter in nature.

Figure 10:
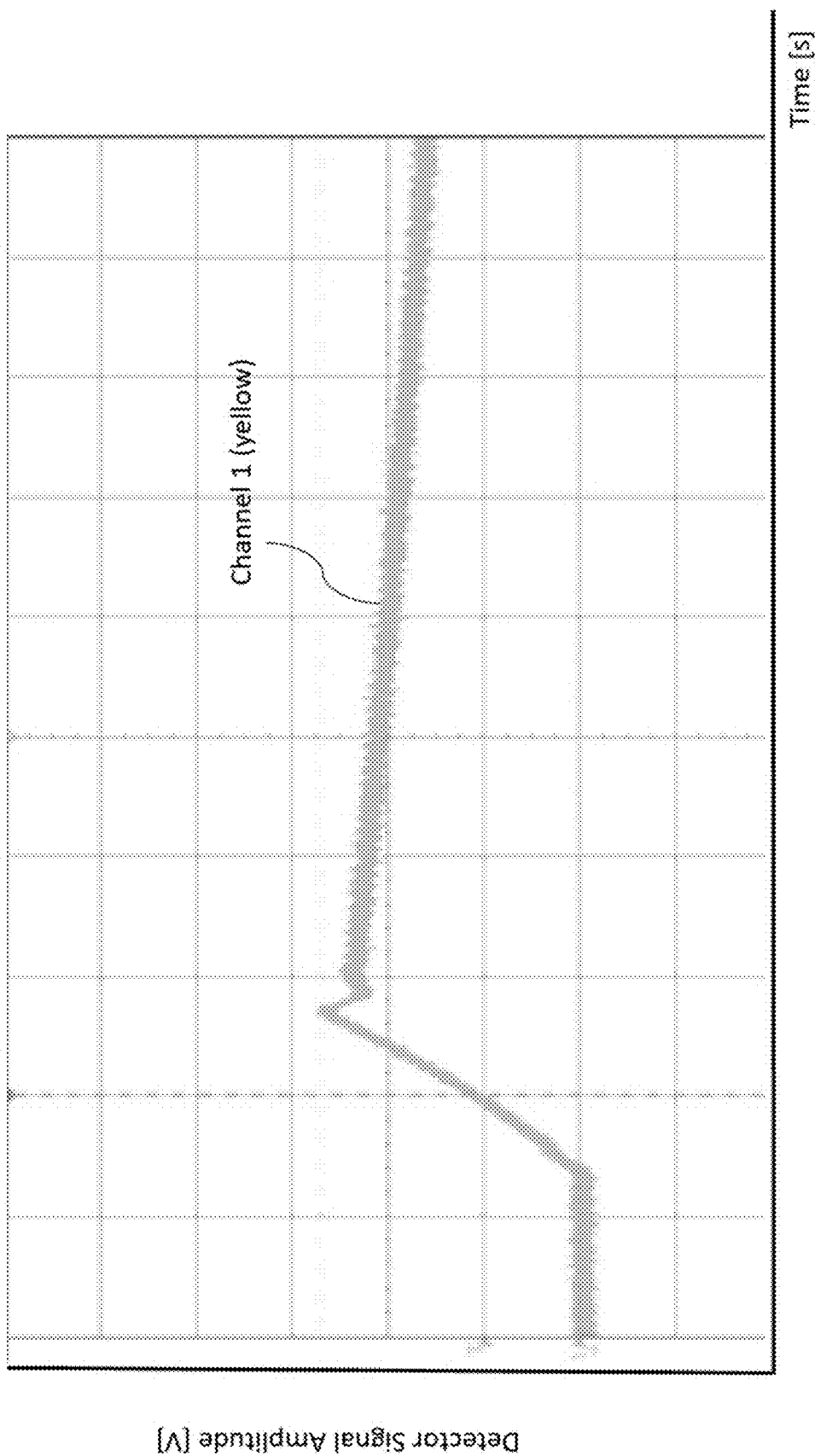
FIG. 10 is a plot of a detector signal waveform for Example 1 of the disclosure.

FIG. 10 is a plot of a detector signal waveform for Example 1 of the disclosure. The plot shown in FIG. 10 depicts a detector signal waveform for a laser-on pulse with standard mirrors (1.400Vp): laser side (back scatter) 50% of total obstructed. The experimental data presented in the plot of FIG. 10 indicates that while 50% of the clear aperture (light collecting ability) of the optical collection system 120 was removed, 30% of the entire optical collection system 120 laser power-up pulse signal was lost. This indicates that the scattered light energy from the flow chamber 106 is forward scatter in nature.

Check-Pulses Effectiveness Investigation Summary: As shown by the plots of FIGS. 7A-7C, 8A-8C, 9, and 10, the laser-on pulse with mirrors is repeatable for the following cases: (a) Laser-on pulse with mirrors: 2.0 Vp; (b) Laser-on pulse with black painted mirrors: 200mVp; (c) Laser-on pulse forward scattered: 1.40Vp; and (d) Laser-on pulse back scattered: 0.60Vp. The results of Example 2 also demonstrate that 90% of laser-on pulse waveform is generated from the optical surfaces of the mirror pair. The results of Example 1 further demonstrate that the signal is 70% forward scattered and 30% back scattered. These results show that the signal is strongly weighted to direct forward scatter.

EXAMPLE 2

Study of Allowed LASAIR-IV Signal Loss to Maintain Passing as-Found Calibration Results Example 2 was a study of a manufacturing cell calibration program data-base typical first channel size resolution results calculated for each instrument model type (Particle Measuring Systems, Inc.). Minimum ISO-21501-4 allowed size error was determined from sizing and counting efficiency as-found test limits. Gaussian distribution sizing distribution size error was then converted to amplitude error by applying the LASAIR-III theoretical sizing calculations. The final result was calculated to represent the maximum amount of particle signal loss that could be observed while the instrument would theoretically pass the as-found calibration requirements of ISO-21501-4.

Summary table of Example 2 study results:

| Inst Model | First CH Size | First CH Res Study | # of Units in Study | 10% Size Error Limit | 30% C.E. Size Error Limit | 30% C.E. Size Error Limit | Amplitude Error Limit |
|---|---|---|---|---|---|---|---|
| 310C | 0.3 um | 7.4% | 1477 | 30 nm | 12.1 nm | 4.0% | 20.2% |
| 310B | 0.3 um | 7.6% | 141 | 30 nm | 12.4 nm | 4.1% | 20.7% |
| 350L | o.3 um | 5.0% | 534 | 30 nm | 8.1 nm | 2.7% | 13.6% |
| 5100 | 0.5 um | 15.0 | 1057 | 50 nm | 42.9 nm | 8.6% | 17.7% |
| 510 (bio) | 0.5 um | 10.0% | 1 | 50 nm | 27.5 nm | 5.5% | 11.4% |

LASAIR-IV Allowed Signal Loss Summary: The Check Pulses test would require the ability to detect an 11.4% decrease in light level, in order to ensure passing as-found calibration verification results. The effect of possible 60 Hz ambient light noise may be minimized by averaging multiple pulses. This may improve the accuracy of this test.

The results of Example 2 demonstrate that the laser-on pulse may be detected in greater than or equal to 2 ms. The entire decay (e.g., represented in FIG. 5 by the trailing edge 514 of the detector signal waveform 502 for times greater than the time at which the peak 510 is attained) may be detected in greater than or equal to 250 ms following laser-off. The entire laser-on/laser-off pulse cycle may be detected in greater than or equal to 256 ms, so up to 4 samples may be averaged in a 1 second time period. The results of Example 2 also demonstrates the ability of the check pulses to detect the required 11.4% amplitude shift in the laser power-up pulse amplitude, which is needed to ensure passing as-found calibration results, without the need to measure pulse height amplitudes of reference calibration particles.

EXAMPLE 3

Figure 11:
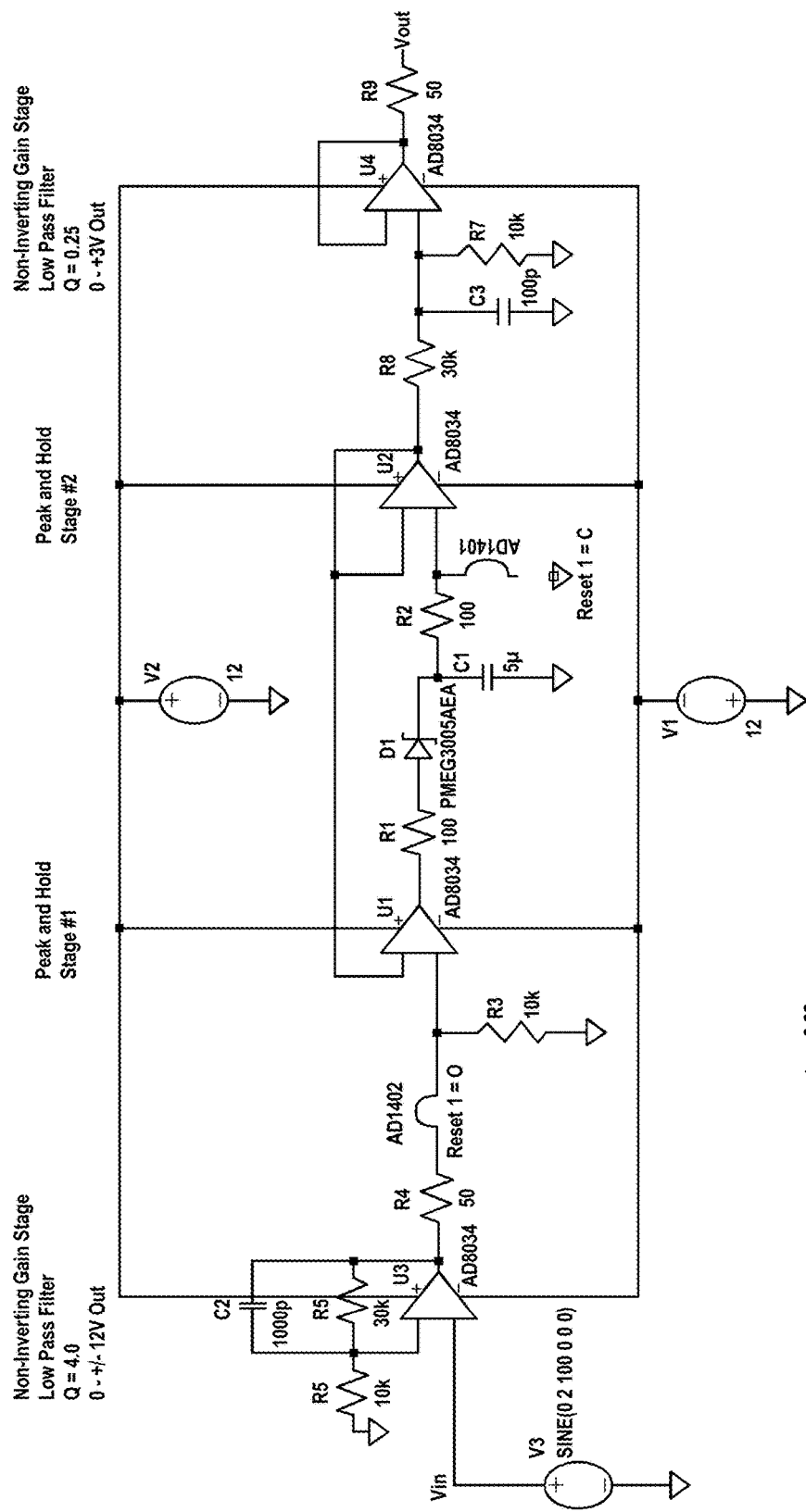
FIG. 11 is a schematic diagram of a frequency-tuned closed loop peak and hold circuit with reset in accordance with one embodiment of the disclosure.

Description of Detector Board Low Speed, Check Pulses, Peak and Hold ADC Circuit FIG. 11 is a schematic diagram (LT-Spice) of a frequency-tuned closed loop peak and hold circuit with reset 1900 in accordance with an embodiment of the disclosure.

Stage 1 of circuit 1900: Voltage gain amplifier with bandwidth limiting (Q=4.0). Allows gain scaling and low pass filtering of check pulses signal. Signal originated from the high gain Bessel filter output. Primary components: (1 stage) AD8034 FET op amp, +/−12Vdc PS.

Stages 2 & 3 of circuit 1900: Classical closed-loop peak-and-hold circuit, with reset feature. Primary components: (2 stages) AD8034 FET op amp, (1) PMEG3002AEB Schottky Barrier diode, hold charge capacitor, isolation resistor to buffer first amp output from charge capacitor, ADG1402 and ADG1401 CMOS SPST peak-and-hold reset switches, SN65LVDS2DBVR differential line receiver to drive reset switches from main PCB, isolation resistor to buffer switch from charge capacitor, +/−12Vdc PS.

Stage 4 of circuit 1900: Voltage gain amplifier with bandwidth limiting (Q=0.25). Voltage divider on input to scale peak-and-hold+12Vdc maximum output to the ADC128S022 ADC 3.3Vdc maximum input range. Low pass filtering at output. Primary components: (1 stage) AD8034 FET op amp, +/−12Vdc PS.

Due to the charge capacitor circuit Schottky barrier diode voltage drop, peak and hold circuit signal loss will be less than 100 mV in circuit 1900. Accounting for this signal loss in the firmware calculations may be accounted for in order to accurately calculate signal loss percentage.

The various components costs of the Detector Board Low Speed, Check Pulses, Peak and Hold ADC Circuit (e.g., circuit 1900) (e.g., components ADG1401, ADG1402, AD8034, PMEG3005AEA, ADC128S022, SN65LVDS2DBVR) is low, totaling less than about $15.00.

EXAMPLE 4

Timing Considerations for Low Speed, Check Pulses, Peak and Hold ADC Circuit

Figure 12:
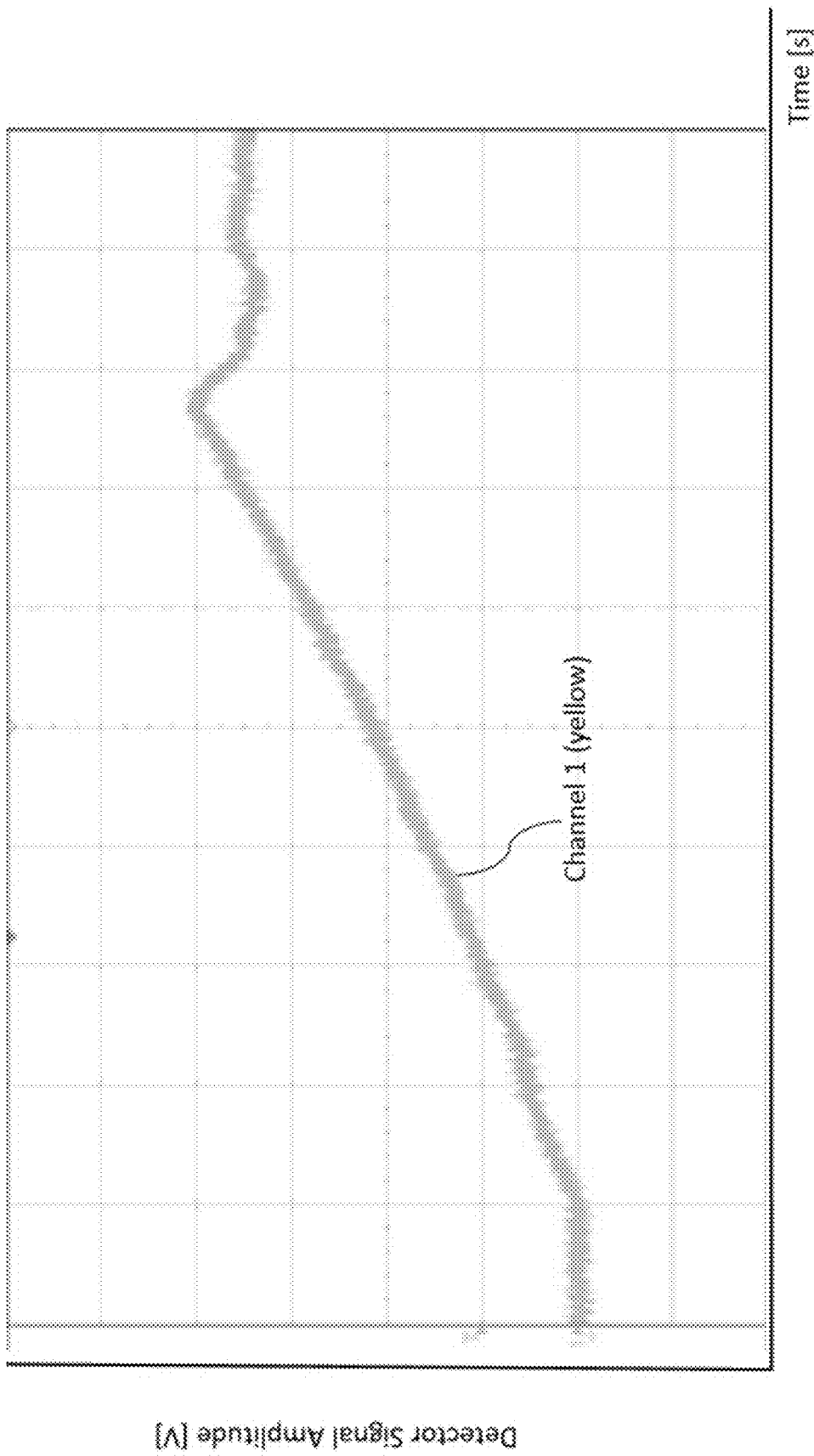
FIG. 12 is a plot of a detector signal waveform for Example 4 of the disclosure.
Figure 13:
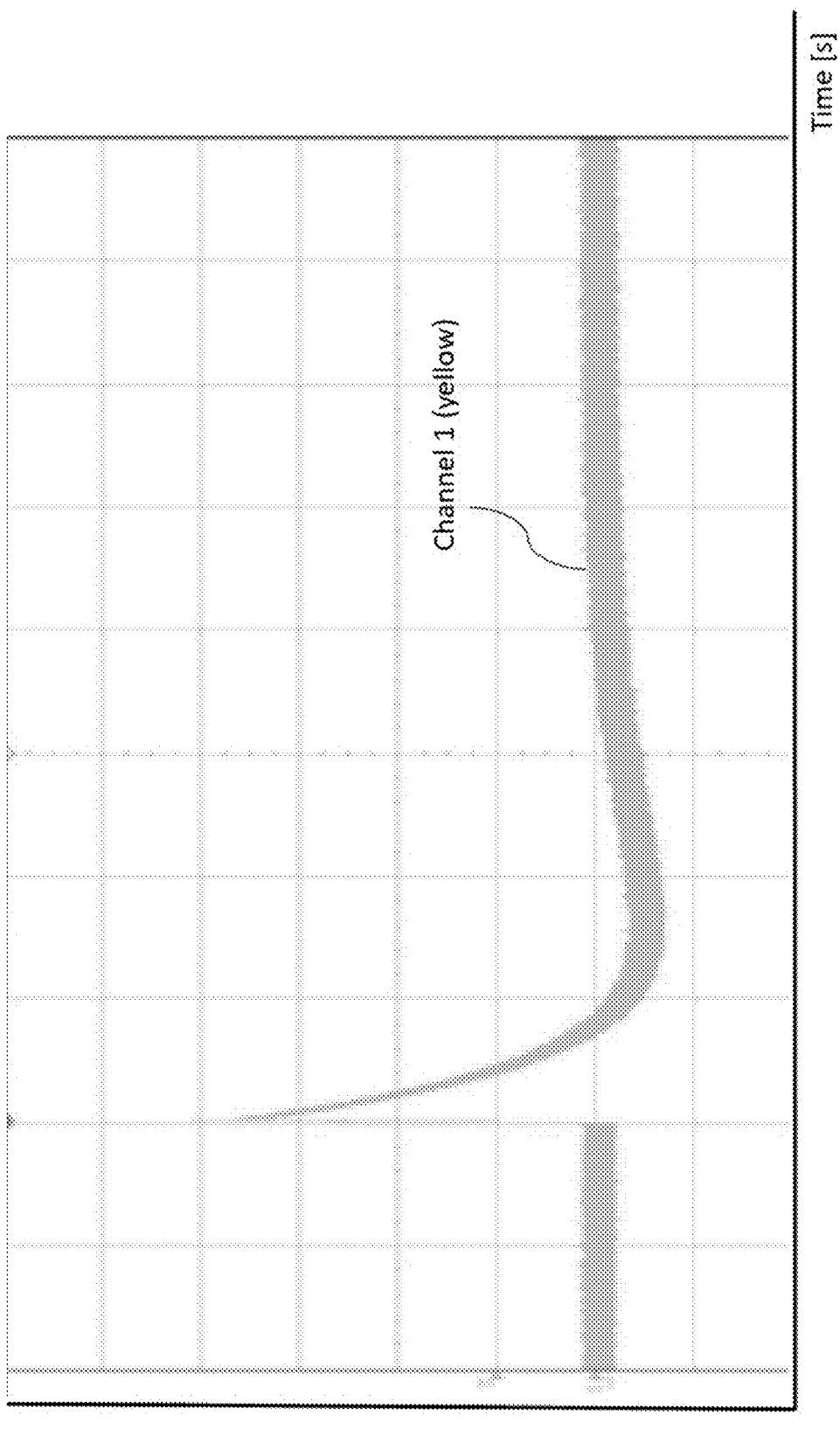
FIG. 13 is a plot of the detector signal waveform of FIG. 12 in a time extended view.

FIG. 12 is a plot of a detector signal waveform for Example 4 of the disclosure. The plot shown in FIG. 12 depicts a detector signal waveform for a laser-on pulse with a peak rise time of 1.35 ms (allowing for circuit tolerance: 2 ms). FIG. 13 is a plot of the detector signal waveform of FIG. 12 in a time extended view. The experimental data shown in the plots of FIGS. 12 and 13 demonstrate that the associated check pulses AC coupling circuitry requires a total event time of approximately 250 ms, before the circuit has settled back to a pre-pulse value of 0 Vdc. Therefore, the peak and hold circuit used to measure the laser power-up scattered light pulse can operate at a cycle frequency of no faster than 4 Hz (250 ms).

Figure 14:
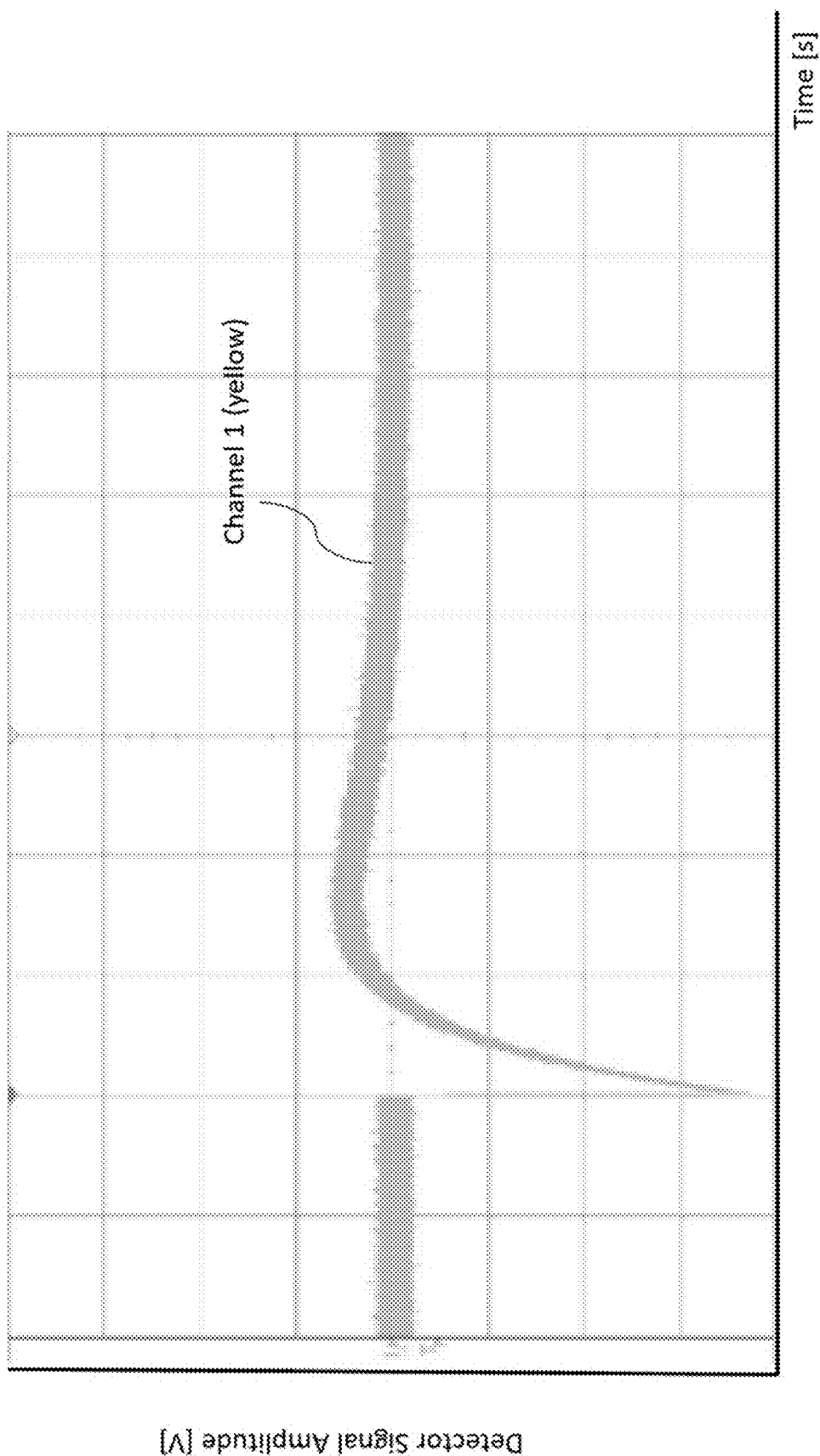
FIG. 14 is a plot of a detector signal waveform for Example 4 of the disclosure.

FIG. 14 is a plot of a detector signal waveform for Example 4 of the disclosure. The plot shown in FIG. 14 depicts a detector signal waveform for a laser-off pulse with an AC coupling pulse settling time of 250 ms. The experimental data shown in the plots of FIG. 14 demonstrate that the associated check pulses AC coupling circuitry requires a total event time of approximately 250 ms, before the circuit has settled back to a pre-pulse value of 0Vdc. Therefore, the peak and hold circuit used to measure the laser power-up scattered light pulse can operate at a cycle frequency of no faster than 4 Hz (250 ms).

The results of Example 4 demonstrate the ability of the laser power-up check pulses to be reliably operated at a cycle frequency of approximately 4 Hz. This enables the system to run several laser power-up check pulses measurements at instrument power-up, or on customer demand, thereby allowing the instrument to offer a quick and convenient automated particle counting health diagnostic feature.

Peak and Hold ADC Timing Considerations Summary:

| Event | Description | Time |
|---|---|---|
| #1 | Sample flow off or filtered | unknown |
| #2 | Turn laser off | 1 ms |
| #3 | Allow 250 ms for AC coupling circuit settling | 250 ms |
| #4 | Reset peak and hold circuit | 1 ms |

-continued

| Event | Description | Time |
|---|---|---|
| #5 | Turn laser on | 1 ms |
| #6 | Allow time for laser-on pulse to peak | 2 ms |
| #7 | Measure laser-on pulse peak value | 1 ms |
| Total | Total single check pulses cycle time | 256 ms |

Steps (i.e., referred to as "events" in the table, above) 1-7 may be repeated as needed to average out 60 Hz ambient light noise. The hold value may be held for >10 ms with less than 1% voltage sag. Accuracy may be improved by ensuring there are no particles present in the laser beam when performing this test. This may be accomplished while sampling filtered air. In many cases, it may be possible to perform the disclosed method with unfiltered ambient air as the sample medium 108, with no flow through sample block (e.g., chamber 106). With use of unfiltered ambient air, detecting outlier data point(s) caused by particle(s) in the beam may be performed when averaging multiple laser-on pulses. The peak and hold circuit may be frequency tuned to diminish the circuit's response to particle activity while sampling normal instrument flow.

The results of Example 4 demonstrate that the check-pulses cycle event time may be greater than or equal to 256 mms. As such, up to 4 samples may be averaged in a 1 second time period.

EXAMPLE 5

Ambient Air Particle Effect on Low Speed, Check Pulses, Peak and Hold ADC Circuit FIGS. 15A-15F depict plots of detector signal waveforms for Example 5 of the disclosure. In FIGS. 15A-15F, oscilloscope Channel #1 (yellow), is the raw particle gain signal used to detect and measure actual particle events. Oscilloscope channel #2 (green), is the low pass filtered, voltage gained (gain of 4) signal that is used by the slow speed, peak and hold circuit. Oscilloscope channel #3 (purple), is the slow speed, check pulses, peak and hold circuit output. The peak and hold circuit DC voltage level is measured at 10 ms after the laser power-up function begins.

Figure 15A:
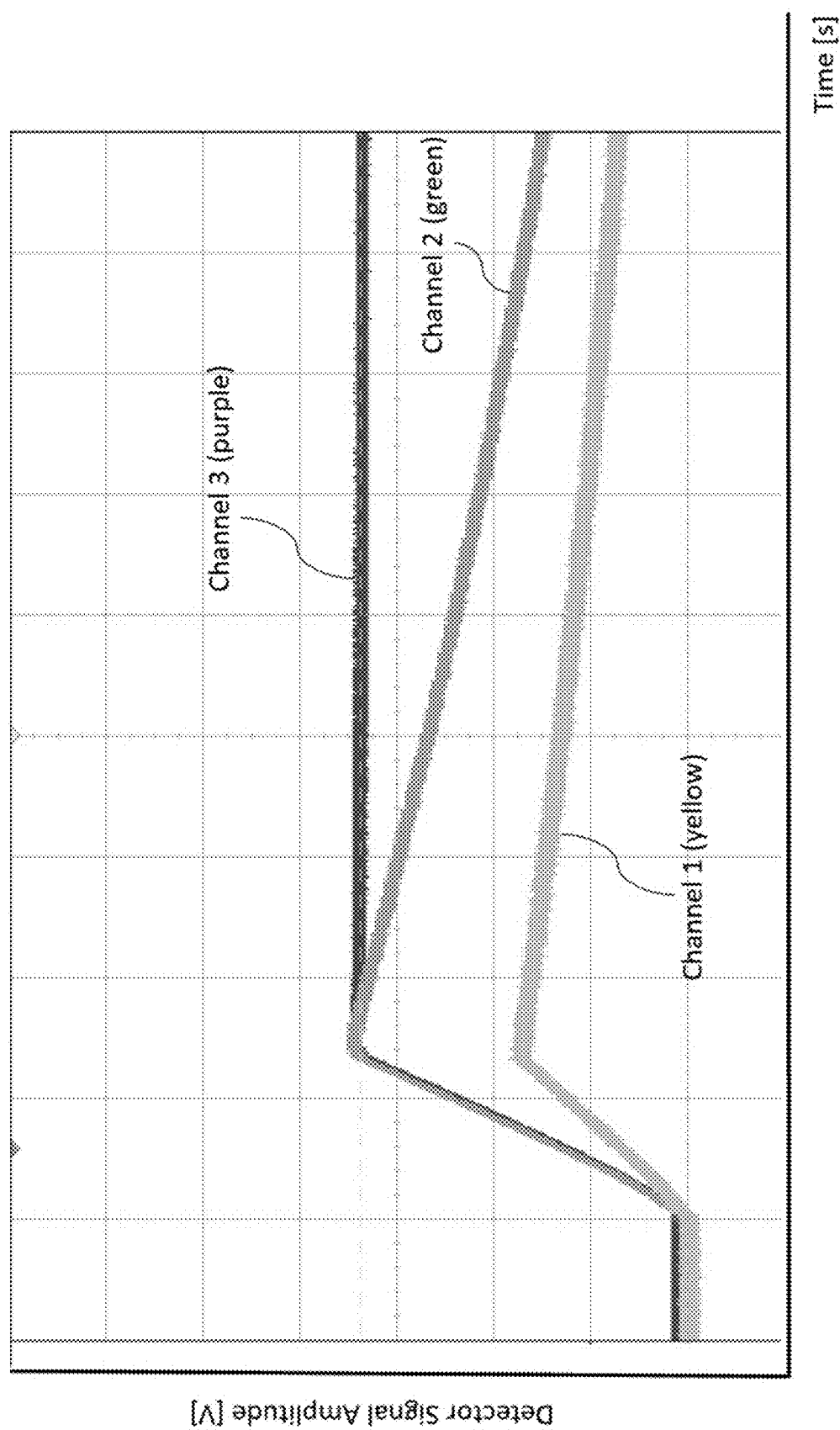
FIG. 15A is a plot of a detector signal waveform for Example 5 of the disclosure.

FIG. 15A is a plot of a functioning low speed, check pulses, peak and hold circuit, responding to a check pulses, laser power-up function, with no particles present in the path of the laser beam. The measured check pulses peak DC value is 3.375Vdc. The check pulses, laser power-up function produces a very repeatable peak DC level of 3.375Vdc, with a 95% upper confidence limit (UCL) of less than 37.5mVdc, which indicates better than 1% repeatability with a 95% UCL.

The peak and hold circuit are designed to not have sufficient speed to react to particle events that happen to occur during the check pulses laser power ramp-up function. This allows the check pulses function to be fairly immune to the presence of moderate particulate levels present during the check pulses function.

In FIGS. 15A-15F, oscilloscope Channel #1 (yellow), is the raw particle gain signal used to detect and measure actual particle events. Oscilloscope channel #2 (green), is the low pass filtered, voltage gained (gain of 4) signal that is used by the slow speed, peak and hold circuit. Oscilloscope channel #3 (purple), is the slow speed, check pulses, peak and hold circuit output. The peak and hold circuit DC voltage level is measured at 10 ms after the laser power-up function begins.

Figure 15B:
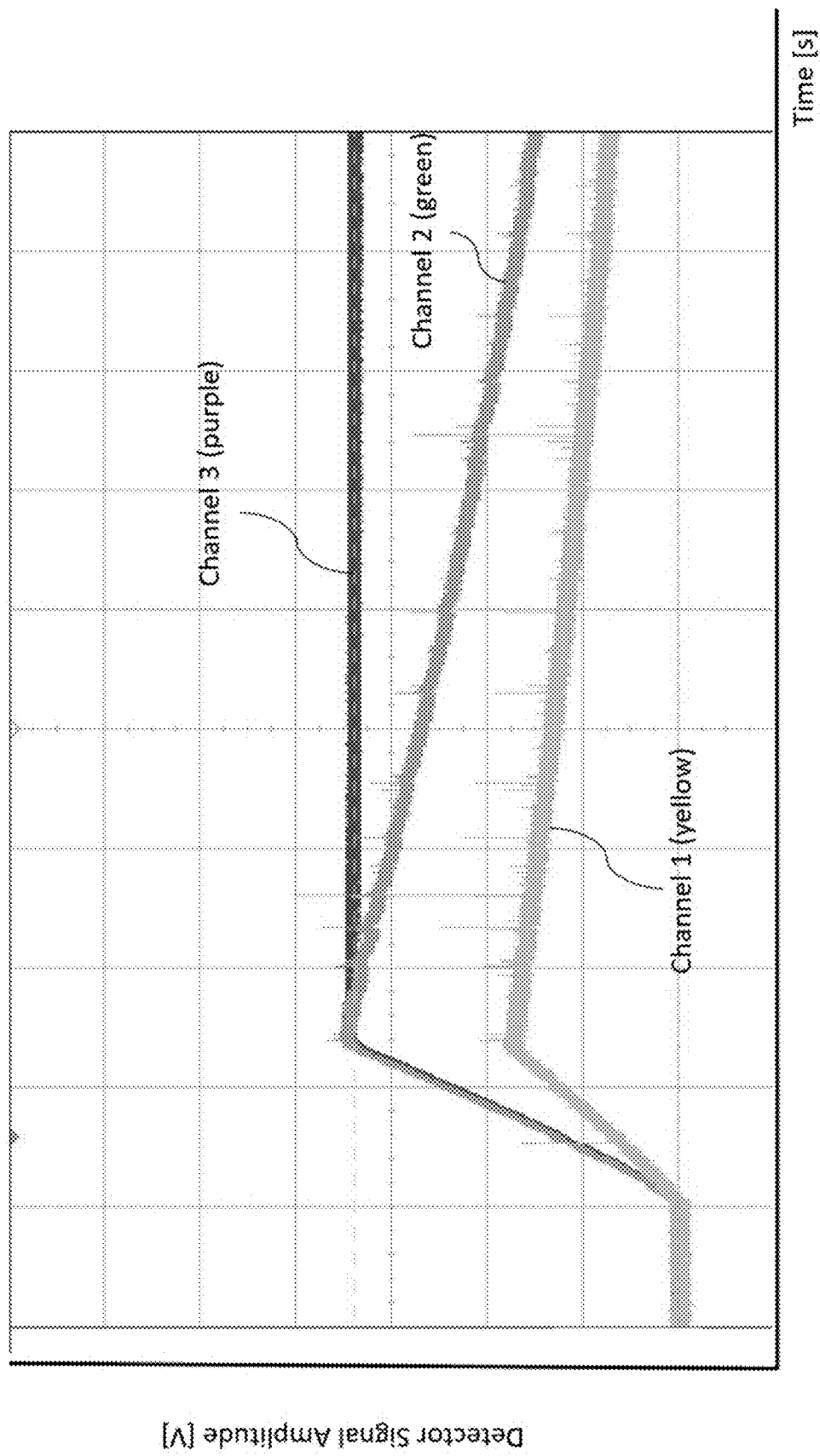
FIG. 15B is a plot of a detector signal waveform for Example 5 of the disclosure.

FIG. 15B is a plot of a functioning low speed, check pulses, peak and hold circuit, responding to a check pulses, laser power-up function, with air particle present in the path of the laser beam. The air particle contamination level is approximately ISO-14644-1 Class 6. The measured check pulses peak DC value is 3.3875Vdc.

Figure 15C:
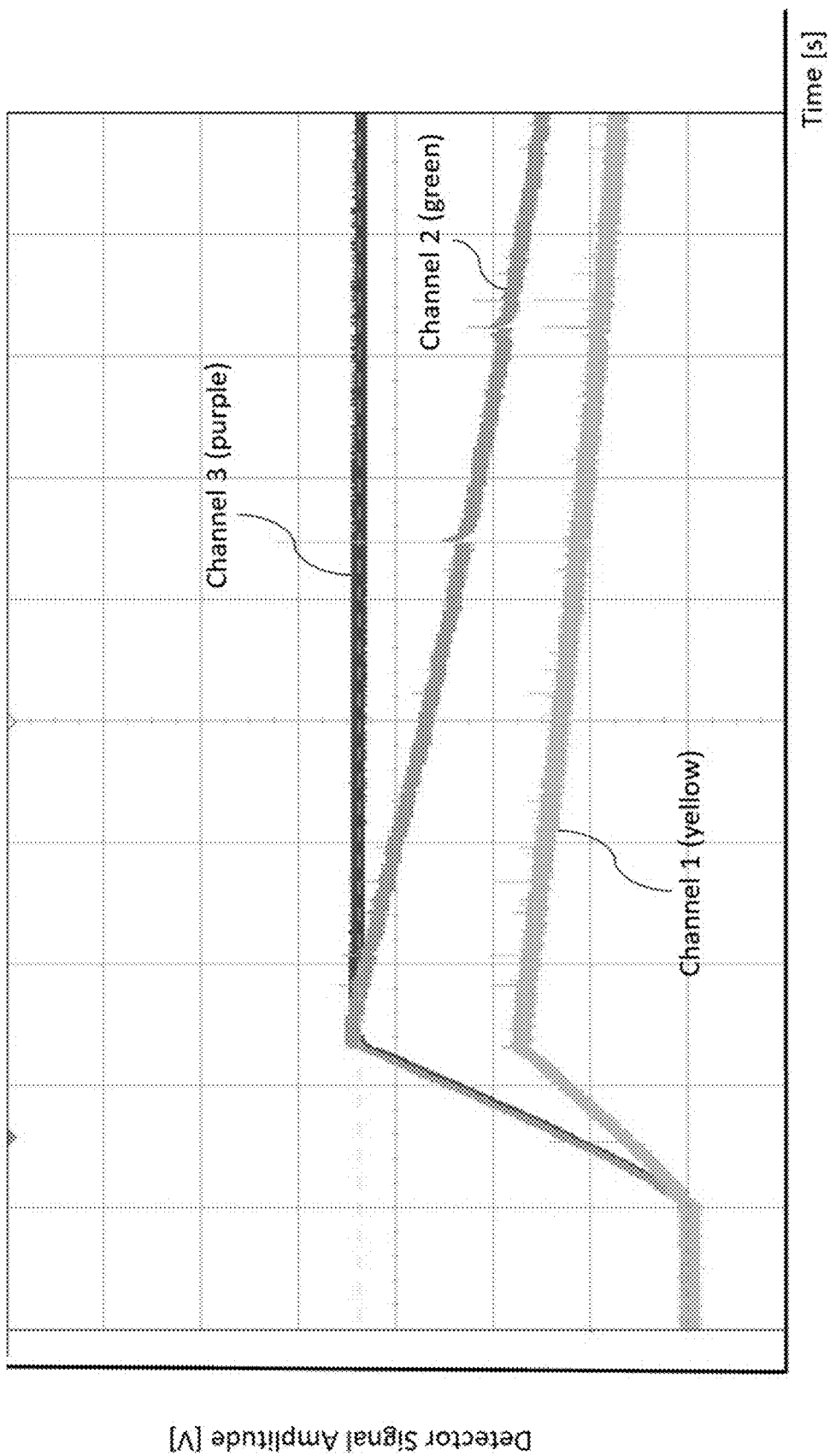
FIG. 15C is a plot of a detector signal waveform for Example 5 of the disclosure.

FIG. 15C is a plot of a functioning low speed, check pulses, peak and hold circuit, responding to a check pulses, laser power-up function, with particles present in the path of the laser beam. The air particle contamination level is approximately ISO-14644-1 Class 6. The measured check pulses peak DC value is 3.375Vdc.

Figure 15D:
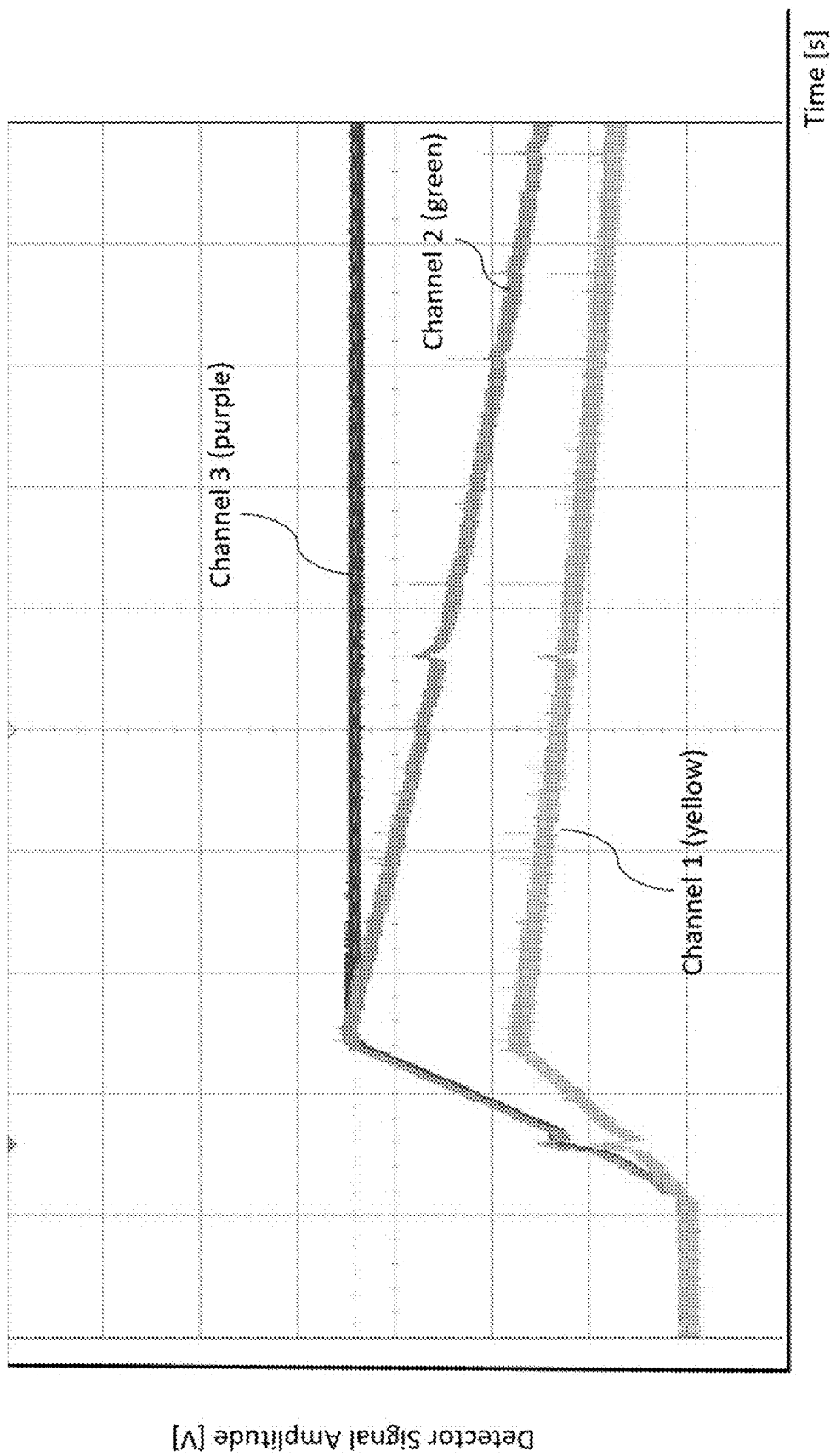
FIG. 15D is a plot of a detector signal waveform for Example 5 of the disclosure.

FIG. 15D is a plot of a functioning low speed, check pulses, peak and hold circuit, responding to a check pulses, laser power-up function, with particles present in the path of the laser beam. The air particle contamination level is approximately ISO-14644-1 Class 6. The measured check pulses peak DC value is 3.4125Vdc.

Figure 15E:
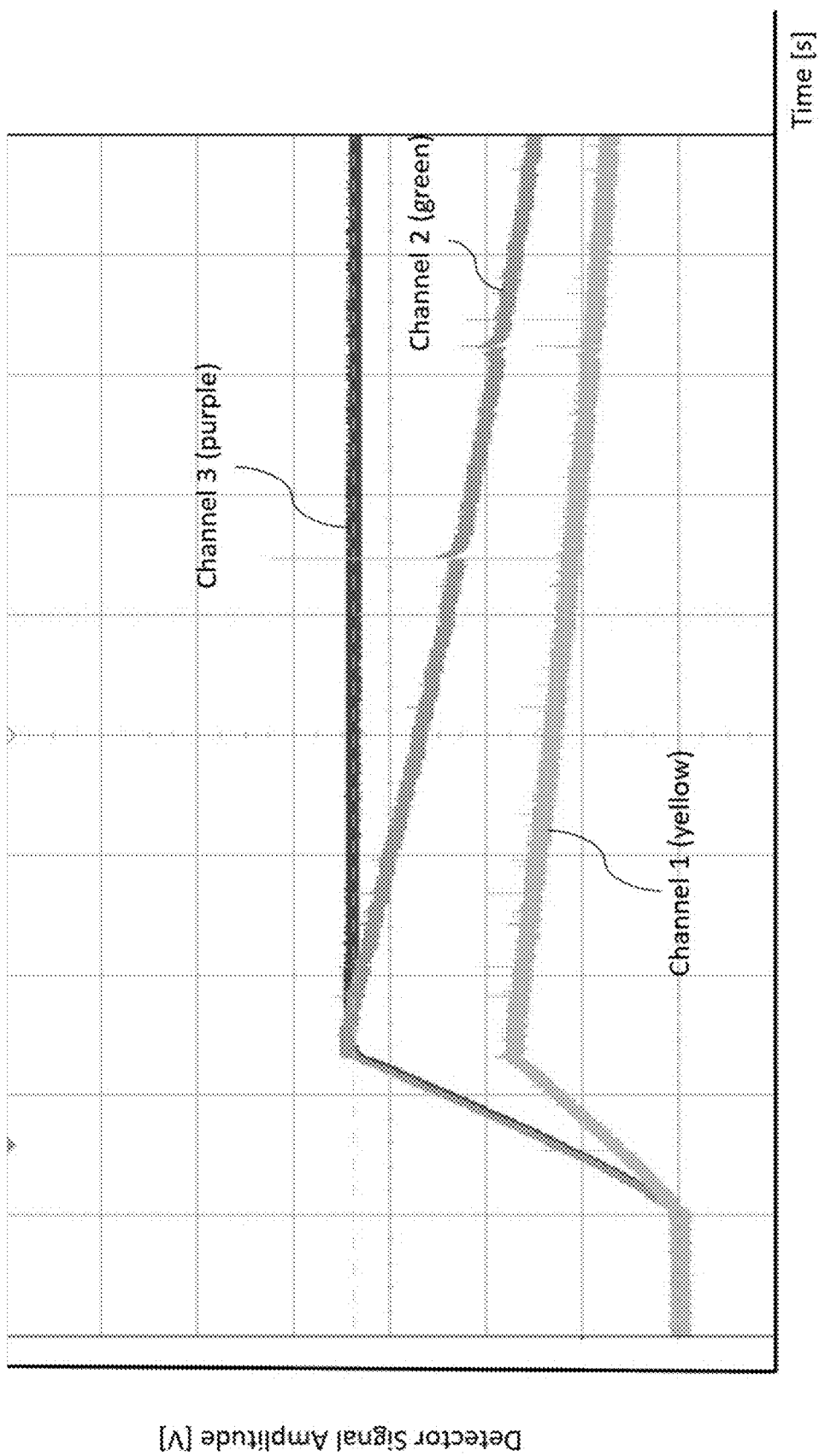
FIG. 15E is a plot of a detector signal waveform for Example 5 of the disclosure.

FIG. 15E is a plot of a functioning low speed, check pulses, peak and hold circuit, responding to a check pulses, laser power-up function, with particles present in the path of the laser beam. The air particle contamination level is approximately ISO-14644-1 Class 6. The measured check pulses peak DC value is 3.375Vdc.

Figure 15F:
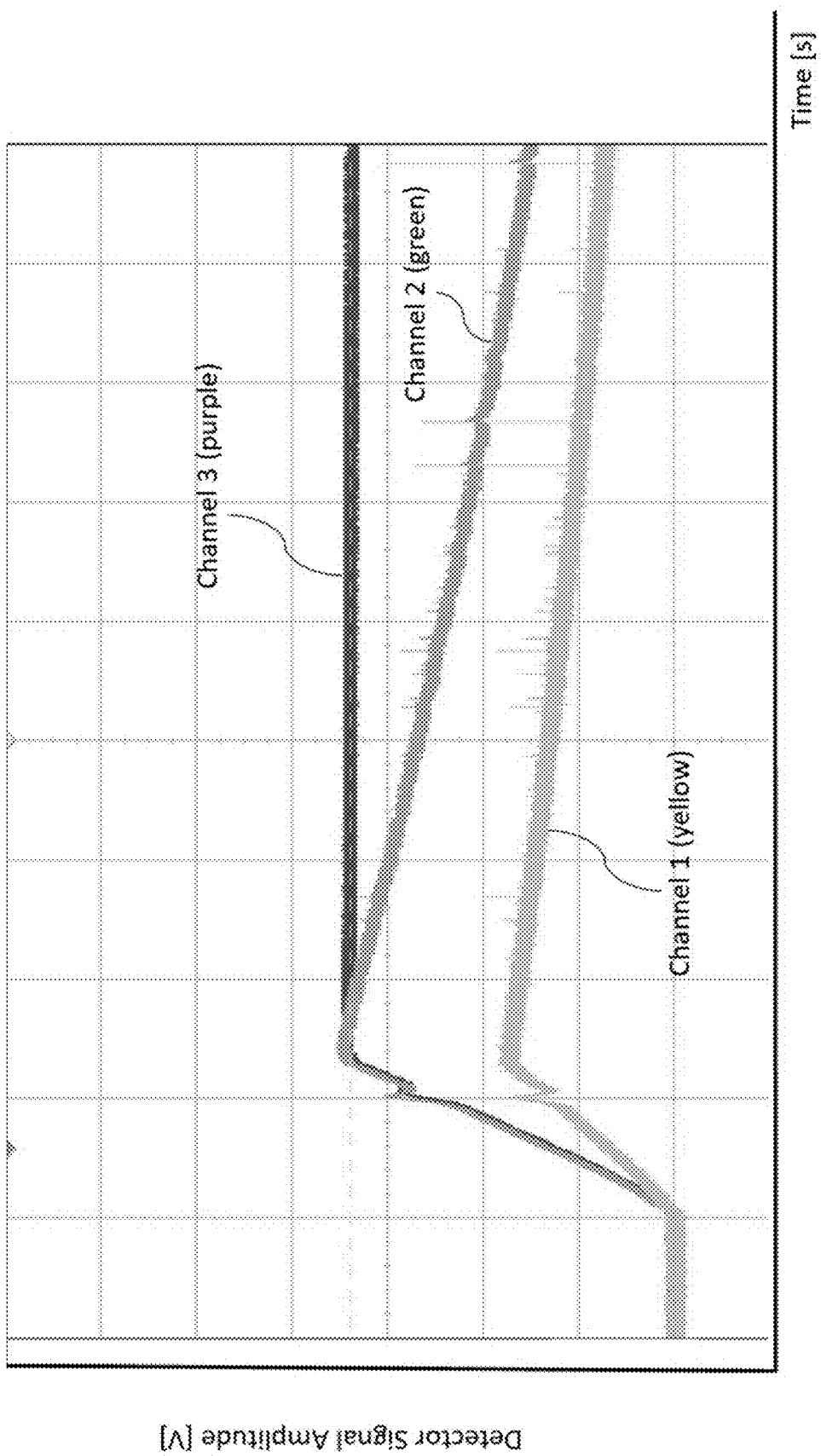
FIG. 15F is a plot of a detector signal waveform for Example 5 of the disclosure.

FIG. 15F is a plot of a functioning low speed, check pulses, peak and hold circuit, responding to a check pulses, laser power-up function, with particles present in the path of the laser beam. The air particle contamination level is approximately ISO-14644-1 Class 6. The measured check pulses peak DC value is 3.3875Vdc.

The five check pulses, peak and hold circuit, responding to a check pulses, laser power-up function, with particles present in the laser beam, are 3.3875Vdc, 3.375Vdc, 3.4125Vdc, 3.375Vdc, and 3.3875Vdc. The three-sigma spread of these five measurements is a mean value of 3.3875Vdc, with a+/−0.04593 Vdc (1.36%), three-sigma spread. This data indicates that there is 95% probability of measuring a check pulses function with particle contamination present, to measure with 1.8% of the no particles present check pulses function. Therefore, the check pulses function is relatively immune to the presence of moderate particulate contamination in the air the instrument is operating in.

The results of Example 5 shown in FIGS. 15A-15F demonstrate that the following three options may be practiced:

Option #1: Ensure that only filtered air is in the sample block when the check-pulses test is performed. The instrument blower would then be running filtered air through the sample block during the test. This might best be accomplished as a customer activated diagnostic health check, which requests the customer to place a zero count filter on the instrument. In this case, the most accurate check-pulses results would be obtained. Tuning the frequency response of the peak and hold circuit to largely not respond to faster particle and pulse noise event times may minimize the influence of stray particles and pulse noise. Ensuring there is filtered air may also improve accuracy for performing the signal/noise test.

Option #2: No filtered instrument inlet required. If the check-pulses test ensures the instrument blower is off, initial testing indicates a decreased probability of a particle being present in the beam during the test. In the experiments, approximately >10% of the check-pulses test runs had a particle present in the laser beam. However, some particle migration through the laser beam was observed even when the blower was off. These slow moving particle events tended to be longer in duration than the laser-on pulse, and therefore may have been recognizable as particle events that could be excluded in the check-pulses averaging. The less accurate check-pulses test under these conditions may be implemented as a boot-up diagnostic test with more wide-open pass criteria than option #1.

Option #3: No filtered instrument inlet required. The effect of ambient air particles and pulse noise events may be minimized by intentionally tuning the frequency response of the peak and hold circuit to largely not respond to faster particle event times. The time domain distance between the laser power-up slow speed check pulses pulse (e.g., 2 ms rise-time, 125 Hz), and the higher frequency particle pulses (e.g., 2 μs rise-time, 125 Khz), is a factor of one-thousand. This allows the check pulses circuit to be designed with a low-pass time function that allows the circuit to be fairly immune to the presence of moderate levels of particle contamination in the sampled air present during the check pulses measurement function.

The required response time for detecting the laser-on pulse is about 2 ms signal leading edge (e.g., 2 ms elapsed time 512 of the leading edge 504), while particle and pulse noise events may have leading edge rise times of about 2 μs. In this case, to ensure fast transit times for all particles, the instrument blower may be on during the check-pulse test. The less accurate check-pulses test under these conditions may be implemented as a boot-up diagnostic test with more wide-open pass criteria than option #1.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Every device, system, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that devices, systems, and methods other than those specifically exemplified can be employed in the practice of the invention without resort to undue experimentation. All art-known functional equivalents, of any such devices and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method for determining calibration status of an optical particle analyzer comprising:
   providing an optical particle analyzer including:
      a source of electromagnetic radiation (EMR) for generating a beam of said EMR;
      a chamber for containing a sample medium and for receiving said beam of EMR;
      an optical assembly in optical communication with the source of EMR for directing the beam of EMR from to the chamber;
      a detector for detecting scattered radiation from said beam of EMR;
      an optical collection system for directing said scattered radiation from the beam of EMR from the chamber and to the detector;
   modulating a power applied to the source of EMR;
   in response to the modulating step, inducing a detector signal waveform;
   analyzing the detector signal waveform to determine a value of at least one diagnostic parameter associated with one or more of the source of EMR, the optical assembly, the chamber, the detector, and the optical collection system; and
   determining the calibration status of the optical particle analyzer based on the one or more determined values of the at least one diagnostic parameter;
   wherein the including step includes:
      first receiving, by the detector, the scattered radiation form said beam of EMR at a first radiant power level corresponding to a first power level applied to the source of EMR, and
      second receiving, by the detector, the scattered radiation from said beam of EMR at a second radiant power level corresponding to a second power level applied to the source of EMR; and
      wherein the detector signal waveform has:
         a leading edge defined by a leading edge function;
         a first signal amplitude; and
         a second signal amplitude.

2. The method of claim 1, wherein the source of EMR comprises at least one of a laser, a diode laser, a strip diode laser, a light emitting diode, and an incandescent lamp.

3. The method of claim 1, wherein the chamber comprises a flow chamber.

4. The method of claim 3, wherein the sample medium is a fluid, said method further comprising flowing the fluid through the flow chamber during the modulating step.

5. The method of claim 4, wherein the flowing step comprises filtering the fluid upstream of the flow chamber.

6. The method of claim 1, wherein the sample medium includes particles.

7. The method of claim 1, wherein the modulating step further comprises switching the power applied to the source of EMR from a first power level to a second power level, wherein the switching step comprises switching the power applied to the source of EMR according to a switching waveform having a frequency, a duty cycle, a first switching amplitude corresponding to the first power level, and a second switching amplitude corresponding to the second power level.

8. The method of claim 1, further comprising maintaining the power applied to the source of EMR at a second power level for a time selected over the range of 1 nanoseconds to 10 milliseconds.

9. The method of claim 1, wherein the optical particle analyzer further includes amplification circuitry operably connected to the detector for amplifying a detector signal in response to the inducing step, and wherein the second receiving step includes changing an energization state of the amplification circuitry from a first state to a second state corresponding to the first and second radiant power levels, respectively.

10. The method of claim 9, wherein the leading edge of the detector signal waveform corresponds to the change of the energization state of the amplification circuitry from the first state to the second state.

11. The method of claim 9, wherein the at least one diagnostic parameter is further associated with the amplification circuitry.

12. The method of claim 1, wherein the at least one diagnostic parameter includes a detector signal waveform peak amplitude defined as a value of a difference between a value of the first signal amplitude and a value of the second signal amplitude value, and wherein the analyzing step further comprises determining:
   the value of the first signal amplitude;
   the value of the second signal amplitude; and
   the value of the difference between the first and second amplitude values;
   wherein the optical particle analyzer further includes amplification circuitry operably connected to the detector for amplifying a detector signal in response to the inducing step, and wherein the detector signal waveform peak amplitude is associated with an operational condition of the source of EMR, the chamber, the optical assembly, the optical collection system, the detector, and the amplification circuitry.

13. The method of claim 1, wherein the at least one diagnostic parameter includes an elapsed time for the leading edge, and wherein the analyzing step includes determining the elapsed time for the leading edge; and wherein the optical particle analyzer further includes drive circuitry for the source of EMR, and wherein the elapsed time for the leading edge is associated with an operational condition of the drive circuitry.

14. The method of claim 1, wherein the at least one diagnostic parameter includes the leading edge function, and wherein the analyzing step includes determining the leading edge function of the leading edge; and wherein the leading edge function is associated with an operational condition of the source of EMR, the optical assembly, the chamber, the detector, and the optical collection system of the optical particle analyzer.

15. The method of claim 1, wherein the determining step further comprises comparing the one or more determined values of the at least one diagnostic parameter with corresponding values of at least one of the respective calibration parameter determined at a prior calibration of the optical particle analyzer.

16. The method of claim 15, wherein the comparing step includes determining a difference between the one or more determined values of the at least one diagnostic parameter and the corresponding values of each respective calibration parameter determined at the prior calibration, and determining the calibration status of the optical particle analyzer based on the determined difference.

17. An optical particle analyzer comprising:
   a source of electromagnetic radiation (EMR) for generating a beam of said EMR;
   a chamber for containing a sample medium and for receiving said beam of EMR;

an optical assembly in optical communication with the source for directing the beam of EMR from the source of EMR to the chamber;
a detector for detecting scattered radiation from said beam of EMR;
an optical collection system for directing scattered radiation from the beam of EMR from the chamber and to the detector; and
a processor operably connected to the source and the detector, wherein the processor is programmed to:
  modulate a power applied to the source of EMR from a first power level to a second power level;
  analyze a scattered radiation detector signal waveform induced by the modulation of the power applied to the source of EMR;
  determine a value of at least one diagnostic parameter associated with one or more of the source of EMR, the chamber, the optical assembly, the detector, and the optical collection system; and
  determine a calibration status of the optical particle analyzer based on the one or more determined values of the at least one diagnostic parameter:
wherein
the source of EMR is a laser for generating a laser beam;
said chamber is a flow-chamber:
  wherein the at least one diagnostic parameter includes an amplitude of a peak of the scattered radiation detector signal waveform corresponding to a difference in detector signal amplitudes between;
  the scattered radiation detected by the detector from the laser beam at a first radiant power level from the laser having the applied power at the first power level; and
  the scattered radiation detected by the detector from the laser beam at a second radiant power level from the laser having the applied power at the second power level;
  wherein, in response to the scattered radiation detector signal waveform induced by the modulation of the power applied to the source of EMR, the processor is further programmed to;
  first receive a first detector signal from the detector, the first detector signal representative of scattered radiation from said beam of EMR at a first radiant power level corresponding to the first power level applied to the source of EMR; and
  second receive a second detector signal from the detector, the second detector signal representative of scattered radiation from said bean of EMR at a second radiant power level corresponding to the second power level applied to the source of EMR; and
  wherein the scattered radiation detector signal waveform has:
    a leading edge defined by leading edge function;
    a first signal amplitude; and
    a second signal amplitude.

18. The optical particle analyzer of claim 17, wherein the sample medium is a fluid, and wherein the optical particle analyzer further comprises a flow system for flowing the fluid through the flow chamber.

19. The optical particle analyzer of claim 18, further comprising a filter for filtering the fluid upstream of the flow chamber.

20. The optical particle analyzer of claim 17, wherein the sample medium includes particles.

21. The optical particle analyzer of claim 17, wherein, to modulate the power applied to the source of EMR, the processor is further programmed to switch the power applied to the source of EMR from the first power level to the second power level according to a switching waveform having a frequency, a duty cycle, a first switching amplitude corresponding to the first power level, and a second switching amplitude corresponding to the second power level.

22. The optical particle analyzer of claim 17, wherein the processor is further programmed to maintain the power applied to the source of EMR at a second power level for a time selected over the range of 1 nanoseconds to 10 milliseconds.

23. The optical particle analyzer of claim 17, further comprising amplification circuitry operably connected to the detector for amplifying the first and second detector signals prior to receipt by the processor, and wherein, in response to the modulation of the power applied to the source of EMR, an energization state of the amplification circuitry changes from a first state to a second state corresponding to the first and second radiant power levels, respectively.

24. The optical particle analyzer of claim 23, wherein the leading edge of the scattered radiation detector signal waveform corresponds to the change of the energization state of the amplification circuitry from the first state to the second state.

25. The optical particle analyzer of claim 23, wherein the at least one diagnostic parameter is further associated with the amplification circuitry.

26. The optical particle analyzer of claim 17, wherein the at least one diagnostic parameter includes a scattered radiation detector signal waveform peak amplitude defined as a value of a difference between a value of the first signal amplitude and a value of the second signal amplitude value, and wherein, to analyze the scattered radiation detector signal waveform induced by the modulation of the power applied to the source of EMR, the processor is further programmed to determine:
  the value of the first signal amplitude;
  the value of the second signal amplitude; and
  the value of the difference between the first and second amplitude values;
  the optical particle analyzer further comprising amplification circuitry operably connected to the detector for amplifying the first and second detector signals prior to receipt by the processor, wherein the scattered radiation detector signal waveform peak amplitude is associated with an operational condition of the source of EMR, the chamber, the optical assembly, the optical collection system, the detector, and the amplification circuitry.

27. The optical particle analyzer of claim 17, wherein the at least one diagnostic parameter includes an elapsed time for the leading edge, and wherein, to analyze the scattered radiation detector signal waveform induced by the modulation of the power applied to the source of EMR, the processor is further programmed to determine the elapsed time for the leading edge; further comprising drive circuitry for the source of EMR, wherein the elapsed time for the leading edge is associated with an operational condition of the drive circuitry.

28. The optical particle analyzer of claim 17, wherein the at least one diagnostic parameter includes the leading edge function, and wherein, to analyze the scattered radiation detector signal waveform induced by the modulation of the power applied to the source of EMR, the processor is further programmed to determine the leading edge function of the leading edge; wherein the leading edge function is associated with an operational condition of the source of EMR, the optical assembly, the chamber, the detector, and the optical collection system of the optical particle analyzer.

29. The optical particle analyzer of claim 17, wherein, to determine the value of at least one diagnostic parameter, the processor is further programmed to compare the one or more determined values of the at least one diagnostic parameter with corresponding values of at least one of the respective calibration parameter determined at a prior calibration of the optical particle analyzer.

30. The optical particle analyzer of claim 29, wherein, to compare the one or more determined values of the at least one diagnostic parameter with the corresponding values of at least one of the respective calibration parameter determined at the prior calibration of the optical particle analyzer, the processor is further programmed to determine a difference between the one or more determined values of the at least one diagnostic parameter and the corresponding values of each respective calibration parameter determined at the prior calibration; and the processor is further programmed to determine the calibration status of the optical particle analyzer based on the determined difference.

* * * * *

UNITED STATES PATENT AND TRADEMARK OFFICE
CERTIFICATE OF CORRECTION

PATENT NO. : 11,181,455 B2
APPLICATION NO. : 16/678968
DATED : November 23, 2021
INVENTOR(S) : Thomas A. Bates et al.

Page 1 of 1

It is certified that error appears in the above-identified patent and that said Letters Patent is hereby corrected as shown below:

In the Claims

In Claim 1, Column 31, Line 10, please delete the word "from".

In Claim 1, Column 31, Line 28, please delete the word "including" and replace with the word --inducing--.

In Claim 1, Column 31, Line 30, please delete the word "form" and replace with --from--.

Signed and Sealed this
Twenty-sixth Day of July, 2022

Katherine Kelly Vidal
*Director of the United States Patent and Trademark Office*